United States Patent
Chen et al.

(10) Patent No.: US 12,425,633 B2
(45) Date of Patent: *Sep. 23, 2025

(54) MOTION VECTOR OBTAINING METHOD AND APPARATUS

(71) Applicant: HUAWEI TECHNOLOGIES CO., LTD., Guangdong (CN)

(72) Inventors: Huanbang Chen, Shenzhen (CN); Yin Zhao, Hangzhou (CN); Haitao Yang, Shenzhen (CN); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,330

(22) Filed: Oct. 12, 2023

(65) Prior Publication Data

US 2024/0121421 A1 Apr. 11, 2024

Related U.S. Application Data

(63) Continuation of application No. 17/898,044, filed on Aug. 29, 2022, now Pat. No. 11,812,050, which is a
(Continued)

(30) Foreign Application Priority Data

Jun. 4, 2018 (CN) .......................... 201810564560.8

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/176* (2014.11); *H04N 19/189* (2014.11); *H04N 19/567* (2014.11)

(58) Field of Classification Search
CPC .. H04N 19/513; H04N 19/176; H04N 19/189; H04N 19/567; H04N 19/139; H04N 19/105; H04N 19/433; H04N 19/56
See application file for complete search history.

(56) References Cited

U.S. PATENT DOCUMENTS 11,184,636 B2 11/2021 Aono et al.
2015/0146780 A1 5/2015 Miyoshi et al.
(Continued)

FOREIGN PATENT DOCUMENTS

CN 101291433 A 10/2008
CN 103716629 A 4/2014
(Continued)

OTHER PUBLICATIONS

Xiaoyu Xiu (InterDigital Communications, Inc) et al, CE4-related: Mismatch between text specification and reference software on clipping the positions of collocated blocks for alternative te mporal motion vector prediction (ATMVP), JVET-L0257, Joint Video Experts Team (JVET) of ITU-T SG 16 WP 3 and ISO/IEC JTC 1/SC 29/WG11, 12th Meeting: Macao, CN, 3 Oct. 12, 2018, 4 pages.
(Continued)

*Primary Examiner* — Boubacar Abdou Tchoussou

(57) ABSTRACT

This application provides a motion vector obtaining method and apparatus. The method includes: determining a target offset vector of a block and identifier information of a target picture, wherein the block comprises at least one sub-block; determining a location of the sub-block; determining, as a target location coordinate value of a collocated sub-block, a location coordinate value obtained by performing a clipping operation on an initial location coordinate value in a range, wherein the initial location coordinate value is based on the location of the sub-block and the target offset vector; and obtaining a motion vector of the sub-block based on a motion vector corresponding to the target location coordi-
(Continued)

nate value. Thus, a range of the target offset vector is limited, so that a quantity of memory read times can be reduced in a process of obtaining the motion vector of the collocated sub-block.

18 Claims, 20 Drawing Sheets

Related U.S. Application Data continuation of application No. 17/111,376, filed on Dec. 3, 2020, now Pat. No. 11,463,721, which is a continuation of application No. PCT/CN2019/090031, filed on Jun. 4, 2019.

(51) Int. Cl.
*H04N 19/189* (2014.01)
*H04N 19/567* (2014.01)

(56) References Cited

U.S. PATENT DOCUMENTS

| | | | |
|---|---|---|---|
| 2015/0264351 A1 | 9/2015 | Miyoshi | |
| 2016/0021386 A1 | 1/2016 | Fishwick | |
| 2016/0337661 A1 | 11/2016 | Pang et al. | |
| 2017/0332099 A1 | 11/2017 | Lee et al. | |
| 2018/0359483 A1 | 12/2018 | Chen et al. | |
| 2020/0177911 A1 | 6/2020 | Aono et al. | |
| 2021/0051340 A1* | 2/2021 | Xiu | H04N 19/56 |
| 2021/0067798 A1* | 3/2021 | Chujoh | H04N 19/176 |
| 2021/0176485 A1 | 6/2021 | Chuang et al. | |
| 2021/0195227 A1 | 6/2021 | Lee et al. | |

FOREIGN PATENT DOCUMENTS

| | | |
|---|---|---|
| CN | 104918057 A | 9/2015 |
| CN | 105532001 A | 4/2016 |
| CN | 105939475 A | 9/2016 |
| CN | 106537915 A | 3/2017 |
| CN | 107027032 A | 8/2017 |
| CN | 108076347 A | 5/2018 |
| EP | 2672708 A2 | 12/2013 |
| EP | 3739885 A1 | 11/2020 |
| JP | 7177181 B2 | 11/2022 |
| WO | 2016123081 A1 | 8/2016 |
| WO | 2019192491 A1 | 10/2019 |

OTHER PUBLICATIONS

Fangdong Chen et al., "Research on Background Modeling Based High Efficiency Video Coding Method",May 6, 2017,total:136pages.
Recommendation ITU-T H.265,"High efficiency video coding", Apr. 29, 2015, total 634 pages.
Jianle Chen et al., "Algorithm Description of Joint Exploration Test Model 1",oint Video Exploration Team (JVET) of ITU-T SG 16 WP 3 and ISO/IEC JTC 1/SC 29/WG 11,1nd Meeting: Geneva, CH, 19 Oct. 21, 2015,JVET-A1001, total:27pages.

\* cited by examiner

MOTION VECTOR OBTAINING METHOD AND APPARATUS

CROSS-REFERENCE TO RELATED APPLICATIONS

This application is a continuation of U.S. patent application Ser. No. 17/898,044, filed on Aug. 29, 2022, which is a continuation of U.S. patent application Ser. No. 17/111,376, filed on Dec. 3, 2020, now U.S. Pat. No. 11,463,721. which is a continuation of International Application No. PCT/CN2019/090031, filed on Jun. 4, 2019. The International Application claims priority to Chinese Patent Application No. 201810564560.8, filed on Jun. 4, 2018. All of the afore-mentioned patent applications are hereby incorporated by reference in their entireties.

TECHNICAL FIELD

This application relates to the field of video encoding and decoding technologies, and more specifically, to a motion vector obtaining method and apparatus.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 part 10 advanced video coding (AVC), the video coding standard H.265/high efficiency video coding (high efficiency video coding, HEVC) standard, and extensions of such standards. The video apparatuses can transmit, receive, encode, decode, and/or store digital video information more efficiently by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into several picture blocks, and the picture block may also be referred to as a tree block, a coding unit (coding unit, CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. The picture may be referred to as a frame, and the reference picture may be referred to as a reference picture.

Various video coding standards including the HEVC standard propose a predictive coding mode used for a picture block. To be specific, a current to-be-coded block is predicted based on a coded video data block. In an intra prediction mode, a current block is predicted based on one or more previously decoded neighboring blocks in the same picture as the current block. In an inter prediction mode, a current block is predicted based on a decoded block in a different picture.

In HEVC inter prediction, motion compensation is performed on all samples in a CU by using same motion information, to obtain predicted values of the samples in the CU. However, the samples in the CU do not necessarily have a same motion feature. Therefore, predicting all the samples in the CU by using the same motion information may reduce accuracy of motion compensation, and further increase residual information.

To resolve the foregoing problem, an advanced temporal motion vector prediction (advanced temporal motion vector prediction, ATMVP) technology is proposed in an existing solution.

A process of performing prediction by using the ATMVP technology mainly includes:

(1) Determine an offset vector of a current to-be-processed block.

(2) Determine, in a corresponding picture, a collocated sub-block of a to-be-processed sub-block based on the offset vector and a location of the to-be-processed sub-block in the current to-be-processed block.

(3) Determine a motion vector of the current to-be-processed sub-block based on a motion vector of the collocated sub-block.

(4) Perform motion-compensated prediction on the to-be-processed sub-block based on the motion vector of the to-be-processed sub-block, to obtain a predicted sample value of the to-be-processed sub-block.

However, in the ATMVP technology, a range of the determined collocated sub-block in the corresponding picture is uncertain, and motion information of the collocated sub-block needs to be frequently read from the corresponding picture. Consequently, memory read bandwidth increases, and complexity of the prediction process increases.

SUMMARY

This application provides a motion vector obtaining method and apparatus, to reduce a quantity of memory read times.

According to a first aspect, a motion vector obtaining method is provided. The method includes: determining a first value range and a second value range; determining a target offset vector of a to-be-processed block and identifier information of a target picture, where the to-be-processed block includes at least one to-be-processed sub-block; determining, in the target picture based on a location of the to-be-processed sub-block and the target offset vector, a collocated sub-block of the to-be-processed sub-block; and determining a motion vector of the to-be-processed sub-block based on a motion vector of the collocated sub-block.

A value of a component of the target offset vector in a first direction falls within the first value range, a value of a component of the target offset vector in a second direction falls within the second value range, and the first direction and the second direction are in an orthogonal relationship.

It should be understood that the at least one to-be-processed sub-block may be obtained by re-partitioning the to-be-processed block. Further, when the to-be-processed block is a coding unit CU, the to-be-processed sub-block is a sub-CU obtained after the CU is partitioned.

In addition, a (picture) block that is in the target picture and that corresponds to the to-be-processed block may be referred to as a corresponding block, the corresponding block includes at least one collocated sub-block, and the target offset vector is used to determine (a location of) the corresponding block that is of the to-be-processed block and that is in the target picture. It should be understood that the target offset vector herein is different from a common motion vector. The target offset vector herein is used to determine the corresponding block. However, a motion vector is usually used to determine a prediction block of a picture block, so as to obtain a predicted sample value of the picture block. In addition, the offset vector may also be referred to as a temporal vector (temporal vector), and the target picture may also be referred to as a corresponding picture.

The first value range and the second value range may be indicated by using a same syntax element.

Specifically, the first value range includes a first threshold and a second threshold, and the second value range includes a third threshold and a fourth threshold. The first threshold may be obtained by parsing the syntax element. The second threshold, the third threshold, and the fourth threshold each have a specific multiple relationship (or another numerical relationship) with the first threshold. In this way, after the first threshold is obtained, the second threshold to the fourth threshold can be obtained based on the multiple relationship between the first threshold and each of the second threshold to the fourth threshold.

Optionally, the identifier information of the target picture is a picture order count POC of the target picture in a picture sequence.

It should be understood that the POC is used to indicate an actual location of the picture in an original picture sequence. To distinguish from an encoding order/a decoding order, the POC may also be referred to as a display order or a play order.

Optionally, the identifier information of the target picture is index information or an index value of the target picture.

In this application, because the component value of the target offset vector falls within a specific value range, the collocated sub-block that is of the to-be-processed sub-block and that is determined in the target picture based on the target offset vector also falls within a specific range of the target picture. Therefore, memory bandwidth and a quantity of memory read times can be reduced by pre-reading a temporal motion vector field in the specific range of the target picture.

With reference to the first aspect, in some implementations of the first aspect, before the determining a motion vector of the to-be-processed sub-block based on a motion vector of the collocated sub-block, the method further includes: obtaining a motion vector of a sample in a preset area in the target picture, where the preset area is an area in which the collocated sub-block of the to-be-processed sub-block may appear.

In this application, because an area in which the collocated sub-block appears in the target picture is determined, a quantity of times of reading a motion vector from the target picture can be reduced by pre-obtaining a motion vector in a specific area in the target picture. In other words, a quantity of memory read times is reduced. In addition, because the motion vector in only the specific area in the target picture is obtained, memory bandwidth can be reduced.

It should be understood that the first value range may be a value range including the first threshold and the second threshold, and the second value range may be a value range including the third threshold and the fourth threshold. The first threshold is less than the second threshold, and the third threshold is less than the fourth threshold.

Optionally, the first value range is any one of (the first threshold, the second threshold), (the first threshold, the second threshold], [the first threshold, the second threshold), and [the first threshold, the second threshold].

Optionally, the second value range is any one of (the third threshold, the fourth threshold), (the third threshold, the fourth threshold], [the third threshold, the fourth threshold), and [the third threshold, the fourth threshold].

In other words, the first value range and the second value range each may be any one of an open range, a closed range, and a half-open and half-closed range.

It should be understood that, when the first value range is (the first threshold, the second threshold), that the value of the component of the target offset vector in the first direction falls within the first value range includes: the value of the component of the target offset vector in the first direction is greater than the first threshold and less than the second threshold.

When the first value range is [the first threshold, the second threshold], that the value of the component of the target offset vector in the first direction falls within the first value range includes: the value of the component of the target offset vector in the first direction is greater than or equal to the first threshold and less than or equal to the second threshold.

With reference to the first aspect, in some implementations of the first aspect, the determining a target offset vector of a to-be-processed block includes: determining an initial offset vector of the to-be-processed block; and when a value of a component of the initial offset vector in the first direction falls within the first value range, and a value of a component of the initial offset vector in the second direction falls within the second value range, determining the initial offset vector as the target offset vector; or when a value of a component of the initial offset vector in the first direction exceeds the first value range and/or a value of a component of the initial offset vector in the second direction falls outside the second value range, performing clipping on a part that is of the value of the component of the initial offset vector in the first direction and that exceeds the first value range and/or a part that is of the value of the component of the initial offset vector in the second direction and that exceeds the second value range, and determining an initial offset vector obtained after the clipping as the target offset vector.

Values of components that are of the initial offset vector obtained after the clipping and that are in the first direction and the second direction respectively fall within the first value range and the second value range.

The values of the components of the initial offset vector in the first direction and the second direction are limited, so that the values of the components of the finally obtained target offset vector in the first direction and the second direction can respectively fall within the first value range and the second value range.

Optionally, when the value of the component of the initial offset vector in the first direction falls outside the first value range and/or the value of the component of the initial offset vector in the second direction falls outside the second value range, the performing clipping on a part that is of the value of the component of the initial offset vector in the first direction and that exceeds the first value range and/or a part that is of the value of the component of the initial offset vector in the second direction and that exceeds the second value range, and determining an initial offset vector obtained after the clipping as the target offset vector includes:

when the value of the component of the initial offset vector in the first direction falls within the first value range, and the value of the component of the initial offset vector in the second direction exceeds the second value range, performing clipping on the part that is of the component of the initial offset vector in the second direction and that exceeds the second value range, and determining an initial offset vector obtained after the clipping as the target offset vector; or when the value of the component of the initial offset vector in the first direction exceeds the first value range, and the value of the component of the initial offset vector in the second direction falls within the second value range, performing clipping on the part that is of the component of the initial offset vector in the first direction and that exceeds the first value range, and determining an initial offset vector obtained after the clipping as the target offset vector; or when the value of the component of the initial offset vector in the first direction exceeds the first value range, and the value of the component of the initial offset vector in the second direction exceeds the second value range, performing clipping on the part that is of the component of the initial offset vector in the first direction and that exceeds the first value range, performing clipping on the part that is of the component of the initial offset vector in the second direction and that exceeds the second value range, and determining an initial offset vector obtained after the clipping as the target offset vector.

It should be understood that, when a value of a component of the initial offset vector in a direction exceeds a maximum value in the direction, clipping is actually truncating a part that is of the component value and that exceeds the maximum value, so that a component value obtained after the truncation is less than or equal to the maximum value. When a value of a component of the initial offset vector in a direction is less than a minimum value in the direction, clipping is actually compensating the component value, that is, increasing the component value, so that a component value obtained after the compensation is greater than or equal to the minimum value.

With reference to the first aspect, in some implementations of the first aspect, the determining an initial offset vector of the to-be-processed block includes: determining a motion vector of a preset spatially neighboring block of the to-be-processed block as the initial offset vector.

Optionally, the determining a motion vector of a preset spatially neighboring block of the to-be-processed block as the initial offset vector includes: determining a motion vector of the first available spatially neighboring block as the initial offset vector in a preset order.

The motion vector of the first available spatially neighboring block is directly determined as the initial offset vector, so that a process of determining the initial offset vector can be simplified.

With reference to the first aspect, in some implementations of the first aspect, the determining a target offset vector of a to-be-processed block includes: determining a target spatially neighboring block in preset spatially neighboring blocks of the to-be-processed block, where a value of a component of a motion vector of the target spatially neighboring block in the first direction falls within the first value range, and a value of a component of the motion vector of the target spatially neighboring block in the second direction falls within the second value range; and using the motion vector of the target spatially neighboring block as the target offset vector.

The motion vector that is of the spatially neighboring block and whose component values fall within the first value range and the second value range is directly determined as the target offset vector, so that a process of determining the target offset vector can be simplified.

With reference to the first aspect, in some implementations of the first aspect, the determining a first value range and a second value range includes: determining the first value range and the second value range based on a location and a size of the to-be-processed block, a location and a size of a coding tree unit CTU in which the to-be-processed block is located, and a preset extension range of a temporal motion vector field of the CTU.

Optionally, the determining the first value range based on a location and a size of the to-be-processed block, a location and a size of a coding tree unit CTU in which the to-be-processed block is located, and a preset extension range of a temporal motion vector field of the CTU includes: determining the first threshold and the second threshold based on the location and the size of the to-be-processed block, the location and the size of the coding tree unit CTU in which the to-be-processed block is located, and the preset extension range of the temporal motion vector field of the CTU, where the first threshold is a minimum value available to the component of the target offset vector in the first direction, and the second threshold is a maximum value available to the component of the target offset vector in the first direction; and obtaining the first value range based on the first threshold and the second threshold.

Optionally, the determining the second value range based on a location and a size of the to-be-processed block, a location and a size of a coding tree unit CTU in which the to-be-processed block is located, and a preset extension range of a temporal motion vector field of the CTU includes: determining the third threshold and the fourth threshold based on the location and the size of the to-be-processed block, the location and the size of the coding tree unit CTU in which the to-be-processed block is located, and the preset extension range of the temporal motion vector field of the CTU, where the third threshold is a minimum value available to the component of the target offset vector in the second direction, and the fourth threshold is a maximum value available to the component of the target offset vector in the second direction; and obtaining the second value range based on the third threshold and the fourth threshold.

With reference to the first aspect, in some implementations of the first aspect, the extension range of the temporal motion vector field of the CTU includes extension ranges of the temporal motion vector field of the CTU in the first direction and the second direction.

Optionally, the first direction is a horizontal direction, and the second direction is a vertical direction.

Optionally, when the first direction is the horizontal direction, and the second direction is the vertical direction, the extension range of the temporal motion vector field of the CTU includes extension ranges of the temporal motion vector field of the CTU in an upward direction, a downward direction, a left direction, and a right direction.

With reference to the first aspect, in some implementations of the first aspect, information about the extension range of the temporal motion vector field of the CTU is carried in at least one of a sequence parameter set SPS, a picture parameter set PPS, and a header field.

Optionally, the extension range of the temporal motion vector field of the CTU is preset.

With reference to the first aspect, in some implementations of the first aspect, the determining a motion vector of the to-be-processed sub-block based on a motion vector of the collocated sub-block includes: scaling the motion vector of the collocated sub-block based on a picture order count POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

Optionally, the scaling the motion vector of the collocated sub-block based on a picture order count POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block includes: determining a difference between the picture order count POC of the picture including the to-be-processed sub-block and the POC of the target reference picture of the picture including the to-be-processed sub-block as a first difference; determining a difference between the POC of the target picture and the POC of the target reference picture of the target picture as a second difference; and scaling the motion vector of the collocated sub-block based on a ratio of the first difference to the second difference, to obtain the motion vector of the to-be-processed sub-block.

Optionally, the scaling the motion vector of the collocated sub-block based on a ratio of the first difference to the second difference, to obtain the motion vector of the to-be-processed sub-block includes: determining the ratio of the first difference to the second difference as a first ratio; and determining a product of the first ratio and the motion vector of the collocated sub-block as the motion vector of the to-be-processed sub-block.

With reference to the first aspect, in some implementations of the first aspect, the motion vector of the to-be-processed sub-block is obtained according to the following formula:

$$MV_s = \frac{P1 - P2}{P3 - P4} \times MV.$$

Herein, P1 represents the POC of the picture including the to-be-processed sub-block, P2 represents the POC of the target reference picture of the picture including the to-be-processed sub-block, P3 represents the POC of the target picture, P4 represents the POC of the target reference picture of the target picture, MV represents the motion vector of the collocated sub-block, and $MV_s$ represents the motion vector of the to-be-processed sub-block.

Optionally, MV is decomposed into a horizontal-direction motion vector $MV_x$ and a vertical-direction motion vector $MV_y$, and a horizontal-direction motion vector $MV_{sx}$ and a vertical-direction motion vector $MV_{sy}$ are separately obtained through calculation according to the foregoing formula.

According to a second aspect, a motion vector obtaining method is provided. The method includes: determining a target offset vector of a to-be-processed block and identifier information of a target picture, where the to-be-processed block includes at least one to-be-processed sub-block; determining, based on a location of the to-be-processed sub-block and the target offset vector, an initial location of a collocated sub-block that is of the to-be-processed sub-block and that is in the target picture; determining the initial location as a target location when the initial location is inside a preset area of the target picture; or determining a location that is in the preset area and that is closest to the initial location as a target location when the initial location is outside the preset area; and determining a motion vector of the to-be-processed sub-block based on a motion vector corresponding to the target location.

It should be understood that the to-be-processed block may include the at least one to-be-processed sub-block, and obtaining of a motion vector of the to-be-processed block may be decomposed into obtaining of a motion vector of each to-be-processed sub-block. In addition, the to-be-processed block may be a CU, and the to-be-processed sub-block is a sub-CU.

A block that is in the target picture and that corresponds to the to-be-processed block may be referred to as a corresponding block, the corresponding block includes at least one collocated sub-block, and the target offset vector is used to determine (a location of) the corresponding block that is of the to-be-processed block and that is in the target picture.

It should be understood that the target offset vector is different from a common motion vector. The target offset vector herein is used to determine the corresponding block. However, a motion vector is usually used to determine a prediction block of a picture block, so as to obtain a predicted sample value of the picture block. In addition, the offset vector may also be referred to as a temporal vector (temporal vector), and the target picture may also be referred to as a corresponding picture.

It should be understood that the corresponding location is relative to the preset area. When a single point is used as a basic composition unit of the preset area, the corresponding location also exists in a form of a single point. When a point set is used as a basic composition unit of the preset area, the corresponding location also exists in a form of a point set. Correspondingly, a distance between a location in the preset area and the corresponding location is a distance between a single point in the preset area and the corresponding location or a distance between a point set in the preset area and a point set of the corresponding location.

In this application, the target location inside the preset area is found based on the initial location and the preset area of the target picture, and then the motion vector of the to-be-processed sub-block is determined based on a motion vector in a specific range of the target picture. Therefore, memory bandwidth and a quantity of memory read times can be reduced by pre-reading a temporal motion vector field in the specific range of the target picture.

Optionally, before the determining a motion vector of the to-be-processed sub-block based on a motion vector of the collocated sub-block, the method further includes: obtaining a motion vector of a sample in the preset area in the target picture, where the preset area is an area in which the collocated sub-block of the to-be-processed sub-block may appear.

In this application, because an area in which the collocated sub-block appears in the target picture is determined, a quantity of times of reading a motion vector from the target picture can be reduced by pre-obtaining a motion vector in a specific area in the target picture. In other words, a quantity of memory read times is reduced. In addition, because the motion vector in only the specific area in the target picture is obtained, memory bandwidth can be reduced.

With reference to the second aspect, in some implementations of the second aspect, the preset area is determined based on a location and a size of a coding tree unit CTU in which the to-be-processed block is located, a size of the target picture, and a preset extension range of a temporal motion vector field of the CTU.

Optionally, the preset area may be represented by using a horizontal coordinate value range and a vertical coordinate value range.

With reference to the second aspect, in some implementations of the second aspect, the extension range of the temporal motion vector field of the CTU includes extension ranges of the temporal motion vector field of the CTU in a first direction and a second direction.

Optionally, the first direction is a horizontal direction, and the second direction is a vertical direction.

Optionally, when the first direction is the horizontal direction, and the second direction is the vertical direction, the extension range of the temporal motion vector field of the CTU includes extension ranges of the temporal motion vector field of the CTU in an upward direction, a downward direction, a left direction, and a right direction.

With reference to the second aspect, in some implementations of the second aspect, information about the extension range of the temporal motion vector field of the CTU is carried in at least one of a sequence parameter set SPS, a picture parameter set PPS, and a header field.

Optionally, the extension range of the temporal motion vector field of the CTU is preset.

With reference to the second aspect, in some implementations of the second aspect, the determining a motion vector of the to-be-processed sub-block based on a motion vector corresponding to the target location includes: scaling the motion vector corresponding to the target location based on a picture order count POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

Optionally, the scaling the motion vector corresponding to the target location based on a picture order count POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block includes: determining a difference between the picture order count POC of the picture including the to-be-processed sub-block and the POC of the target reference picture of the picture including the to-be-processed sub-block as a third difference; determining a difference between the POC of the target picture and the POC of the target reference picture of the target picture as a fourth difference; and scaling the motion vector of the collocated sub-block based on a ratio of the third difference to the fourth difference, to obtain the motion vector of the to-be-processed sub-block.

Optionally, the scaling the motion vector of the collocated sub-block based on a ratio of the third difference to the fourth difference, to obtain the motion vector of the to-be-processed sub-block includes: determining the ratio of the third difference to the fourth difference as a second ratio; and determining a product of the second ratio and the motion vector of the collocated sub-block as the motion vector of the to-be-processed sub-block.

With reference to the second aspect, in some implementations of the second aspect, the motion vector of the to-be-processed sub-block is obtained according to the following formula:

$$MV_s = \frac{P1 - P2}{P3 - P4} \times MV.$$

Herein, P1 represents the POC of the picture including the to-be-processed sub-block, P2 represents the POC of the target reference picture of the picture including the to-be-processed sub-block, P3 represents the POC of the target picture, P4 represents the POC of the target reference picture of the target picture, MV represents the motion vector corresponding to the target location, and $MV_s$ represents the motion vector of the to-be-processed sub-block.

Optionally, MV is decomposed into a horizontal-direction motion vector $MV_x$ and a vertical-direction motion vector $MV_y$, and a horizontal-direction motion vector $MV_{sx}$ and a vertical-direction motion vector $MV_{sy}$ are separately obtained through calculation according to the foregoing formula.

According to a third aspect, a motion vector obtaining apparatus is provided. The apparatus includes modules configured to perform the method in any implementation of the first aspect or the second aspect.

According to a fourth aspect, a motion vector obtaining apparatus is provided, including a nonvolatile memory and a processor that are coupled to each other. The processor invokes program code stored in the memory to perform some or all steps of the method in any implementation of the first aspect or the second aspect.

According to a fifth aspect, a computer-readable storage medium is provided. The computer-readable storage medium stores program code, and the program code includes an instruction used to perform some or all steps of the method in any implementation of the first aspect or the second aspect.

According to a sixth aspect, a computer program product is provided. When the computer program product is run on a computer, the computer is enabled to execute an instruction of some or all steps of the method in any implementation of the first aspect or the second aspect.

DESCRIPTION OF EMBODIMENTS

The following describes technical solutions of this application with reference to accompanying drawings.

Figure 1:
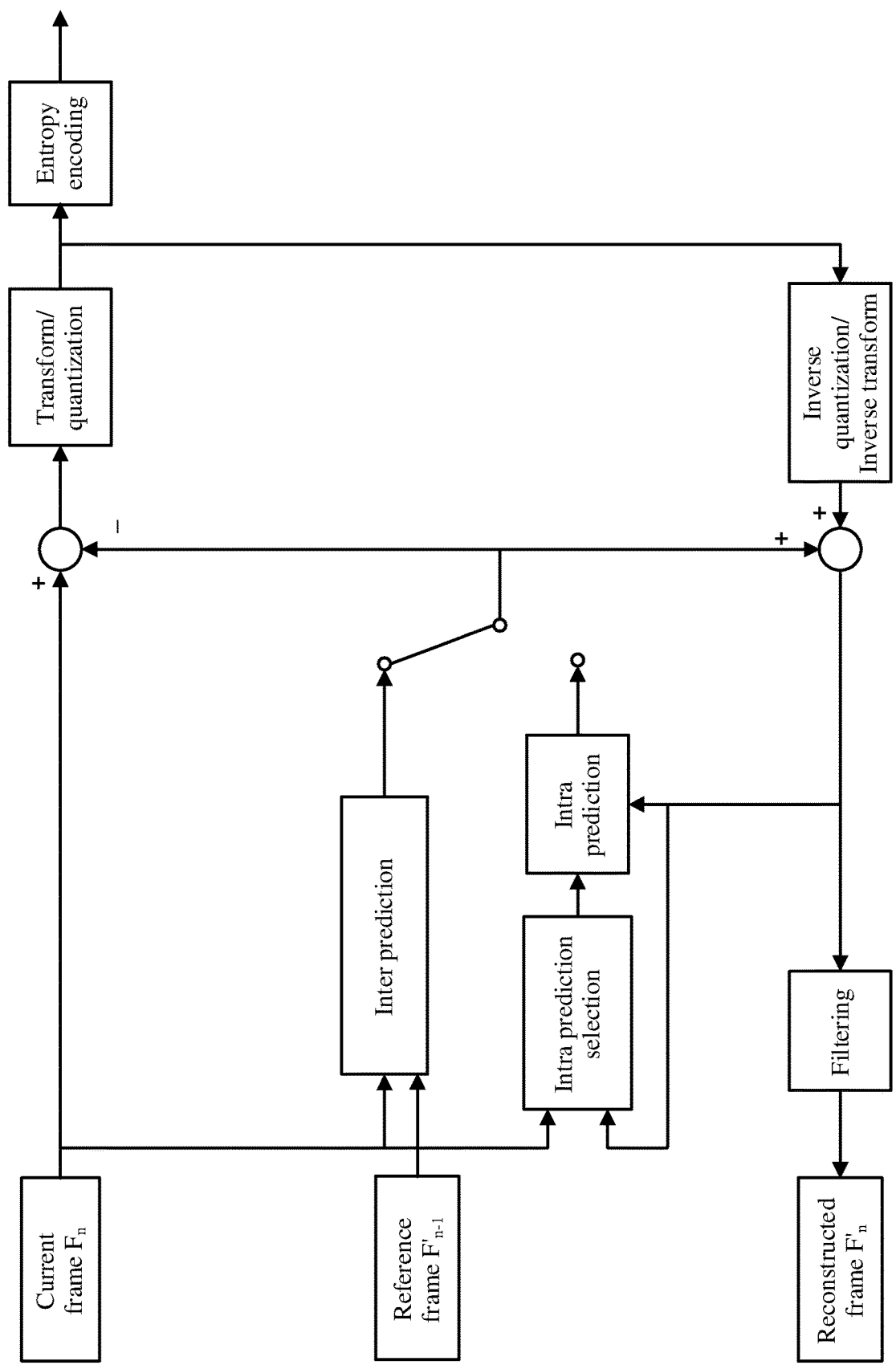
FIG. 1 is a schematic diagram of a video encoding process.
Figure 2:
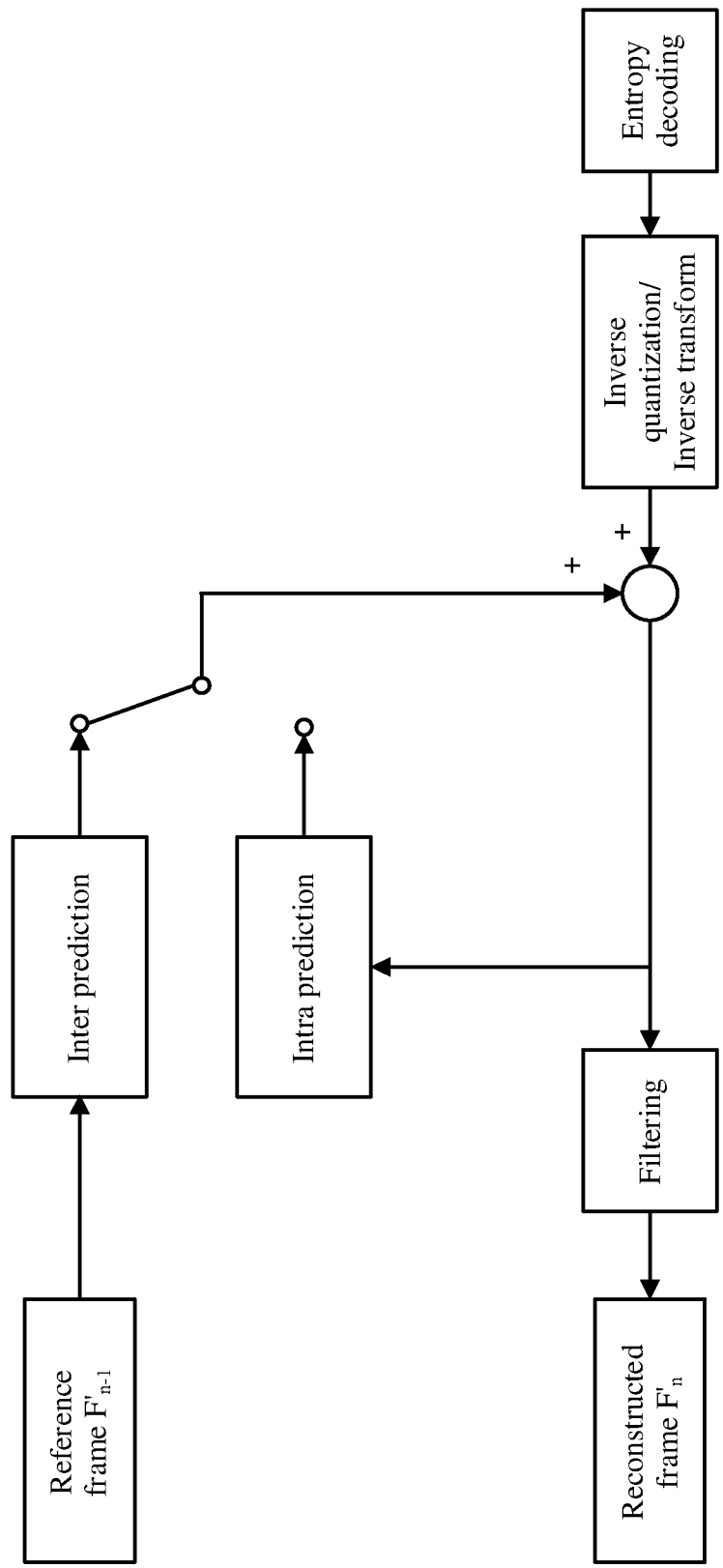
FIG. 2 is a schematic diagram of a video decoding process.

To better understand a process of a motion vector obtaining method in the embodiments of this application, the following first briefly describes an entire video encoding and decoding process with reference to FIG. 1 and FIG. 2.

FIG. 1 is a schematic diagram of a video encoding process.

As shown in FIG. 1, when prediction is performed on a current picture block in a current frame $F_n$, either intra prediction or inter prediction can be performed. Specifically, intra coding or inter coding may be selected based on a type of the current frame $F_n$. For example, when the current frame $F_n$ is an I frame, the intra prediction is used; or when the current frame $F_n$ is a P frame or a B frame, the inter prediction is used. When the intra prediction is used, a sample value of a sample in the current picture block may be predicted by using a sample value of a sample in a reconstructed area in the current frame $F_n$. When the inter prediction is used, a sample value of a sample in the current picture block may be predicted by using a sample value of a sample in a reference block that is in a reference picture $F'_{n-1}$ and that matches the current picture block.

After a prediction block of the current picture block is obtained through the inter prediction or the intra prediction, a difference between the sample value of the sample in the current picture block and a sample value of a sample in the prediction block is calculated to obtain residual information, and transform, quantization, and entropy coding are performed on the residual information to obtain an encoded bitstream. In addition, in the encoding process, superposition further needs to be performed on residual information of the current frame $F_n$ and predicted information of the current frame $F_n$, and a filtering operation is performed, to obtain a reconstructed frame $F'_n$ of the current frame. The reconstructed frame $F'_n$ is used as a reference picture for subsequent encoding.

FIG. 2 is a schematic diagram of a video decoding process.

The video decoding process shown in FIG. 2 is equivalent to an inverse process of the video encoding process shown in FIG. 1. During decoding, entropy decoding, dequantization, and inverse transform are performed to obtain residual information, and whether intra prediction or inter prediction is performed on a current picture block is determined based on a decoded bitstream. If intra prediction is performed, predicted information is constructed by using a sample value of a sample in a reconstructed area in a current frame according to an intra prediction method. If inter prediction is performed, motion information needs to be obtained through parsing, a reference block in a reconstructed picture is determined based on the motion information obtained through parsing, a sample value of a sample in the reference block is used as predicted information, then superposition is performed on the predicted information and the residual information, and a filtering operation is performed to obtain reconstructed information.

The motion vector obtaining method in the embodiments of this application may be applied to both the encoding process and the decoding process. In other words, both an encoder side and a decoder side may perform the motion vector obtaining method in the embodiments of this application. Specifically, the motion vector obtaining method in the embodiments of this application may be applied to the inter prediction processes shown in FIG. 1 and FIG. 2.

In HEVC, there are two inter prediction modes: an advanced motion vector prediction (advanced motion vector prediction, AMVP) mode and a merge (merge) mode. The motion vector obtaining method in the embodiments of this application may be applied to the merge mode of inter prediction.

Figure 3:
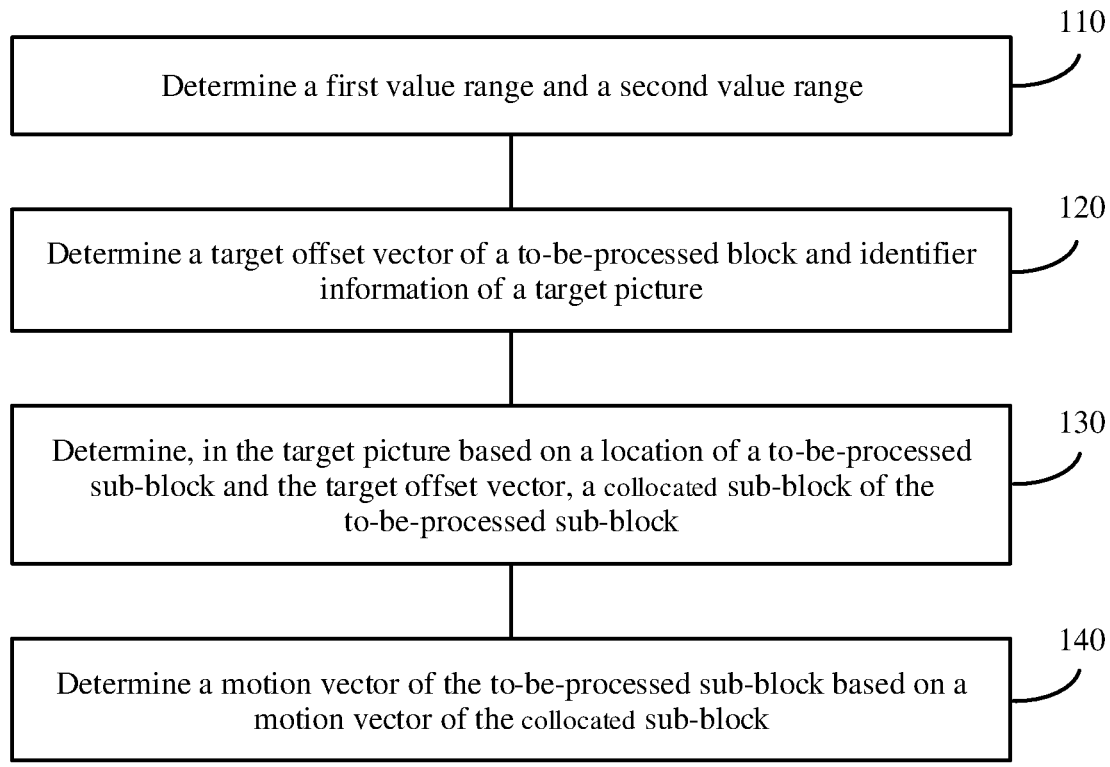
FIG. 3 is a schematic flowchart of a motion vector obtaining method according to an embodiment of this application.

FIG. 3 is a schematic flowchart of a motion vector obtaining method according to an embodiment of this application. The method shown in FIG. 3 may be performed by a video encoding and decoding apparatus, a video codec, a video encoding and decoding system, and another device having a video encoding and decoding function.

The method shown in FIG. 3 includes step 110 to step 140. The following describes step 110 to step 140 in detail.

110: Determine a first value range and a second value range.

Optionally, the first value range is a value range including a first threshold and a second threshold, and the second value range is a value range including a third threshold and a fourth threshold. The first threshold is less than the second threshold, and the third threshold is less than the fourth threshold.

It should be understood that, the first value range and the second value range each may be any one of an open range, a closed range, and a half-open and half-closed range.

A specific representation form of the first value range may be (the first threshold, the second threshold), (the first threshold, the second threshold], or [the first threshold, the second threshold].

A specific representation form of the second value range may be (the third threshold, the fourth threshold), (the third threshold, the fourth threshold], or [the third threshold, the fourth threshold].

120: Determine a target offset vector of a to-be-processed block and identifier information of a target picture.

The to-be-processed block includes at least one to-be-processed sub-block, a value of a component of the target offset vector in a first direction falls within the first value range, a value of a component of the target offset vector in a second direction falls within the second value range, and the first direction and the second direction are in an orthogonal relationship.

A (picture) block that is in the target picture and that corresponds to the to-be-processed block may be referred to as a corresponding block, the corresponding block includes at least one collocated sub-block, and the target offset vector is used to determine (a location of) the corresponding block that is of the to-be-processed block and that is in the target picture. The target offset vector is different from a common motion vector. The target offset vector is used to determine the corresponding block. However, a motion vector is usually used to determine a prediction block of a picture block, so as to obtain a predicted sample value of the picture block. In addition, the offset vector may also be referred to as a temporal vector (temporal vector), and the target picture may also be referred to as a corresponding picture.

The identifier information of the target picture may be specifically a picture order count (picture order count, POC) of a picture frame in the picture sequence, or may be index information or an index value of the target picture.

It should be understood that the POC is used to indicate an actual location of the picture in an original picture sequence. To distinguish from an encoding order/a decoding order, the POC may also be referred to as a display order or a play order.

It should be understood that the at least one to-be-processed sub-block may be obtained by partitioning the to-be-processed block, and the at least one to-be-processed sub-block may form the to-be-processed block. When the to-be-processed block is a CU, the CU may include at least one sub-CU. In addition, the first direction and the second direction may be respectively a horizontal direction and a vertical direction.

When a form of the first value range varies, there are the following specific forms in which the value of the component of the target offset vector in the first direction falls within the first value range:

(1) When the first value range is (the first threshold, the second threshold), the value of the component of the target offset vector in the first direction is greater than the first threshold and less than the second threshold.

(2) When the first value range is (the first threshold, the second threshold], the value of the component of the target offset vector in the first direction is greater than the first threshold and less than or equal to the second threshold.

(3) When the first value range is [the first threshold, the second threshold], the value of the component of the target offset vector in the first direction is greater than or equal to the first threshold and less than or equal to the second threshold.

Similarly, when a form of the second value range varies, there are the following specific forms in which the value of the component of the target offset vector in the second direction falls within the second value range:

(4) When the second value range is (the third threshold, the fourth threshold), the value of the component of the target offset vector in the second direction is greater than the third threshold and less than the fourth threshold.

(5) When the second value range is (the third threshold, the fourth threshold], the value of the component of the target offset vector in the second direction is greater than the third threshold and less than or equal to the fourth threshold.

(6) When the second value range is [the third threshold, the fourth threshold], the value of the component of the target offset vector in the second direction is greater than or equal to the third threshold and less than or equal to the fourth threshold.

In step 120, the target offset vector may be determined in a plurality of manners. Specifically, an initial offset vector (which may also be referred to as a start offset vector) may be first determined, and then values of components of the initial offset vector in the first direction and the second direction are respectively limited to the first value range and the second value range, to obtain the final target offset vector. Alternatively, a motion vector whose component values in the first direction and the second direction respectively fall within the first value range and the second value range may be directly selected from a plurality of motion vectors as the target offset vector. The following describes in detail the two manners of determining the target offset vector.

A first manner includes: determining the initial offset vector, and limiting the values of the components of the initial offset vector in the first direction and the second direction, to obtain the target offset vector.

Specifically, in the first manner, determining of the target offset vector includes step 1201 to step 1203. The following describes step 1201 to step 1203 in detail.

1201: Determine an initial offset vector of the to-be-processed block.

Optionally, a motion vector of a preset spatially neighboring block of the to-be-processed block is determined as the initial offset vector.

Specifically, a motion vector of the first available obtained preset spatially neighboring block may be determined as the initial offset vector in a specific order.

Figure 4:
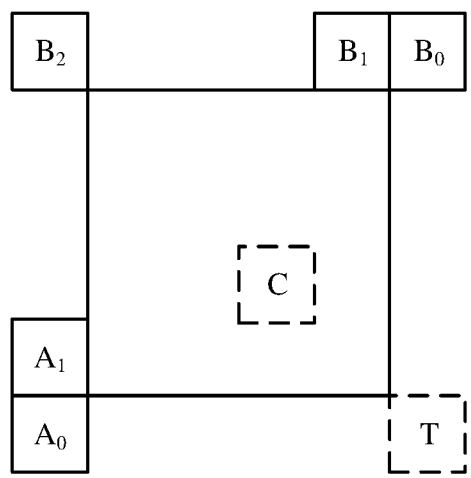
FIG. 4 is a schematic diagram of neighboring blocks of a to-be-processed block.

For example, as shown in FIG. 4, $A_0$, $A_1$, $B_0$, $B_1$, and $B_2$ are spatially neighboring blocks of the to-be-processed block, T is a temporally neighboring block of the to-be-processed block, and C is a picture block that is in a reference picture of the to-be-processed block and that is inside a same location as the to-be-processed block. When the initial offset vector of the to-be-processed block is determined, a motion vector of the first available found neighboring block may be determined as the initial offset vector in an order of $A_1$, $B_1$, $B_0$, and $A_0$.

The motion vector of the first available spatially neighboring block is directly determined as the initial offset vector, so that a process of determining the initial offset vector can be simplified.

1202: When a value of a component of the initial offset vector in the first direction falls within the first value range, and a value of a component of the initial offset vector in the second direction falls within the second value range, determine the initial offset vector as the target offset vector.

For example, when the first value range is (the first threshold, the second threshold) and the second value range is (the third threshold, the fourth threshold), if the value of the component of the initial offset vector in the first direction is greater than the first threshold and less than the second threshold and the value of the component of the initial offset vector in the second direction is greater than the third threshold and less than the fourth threshold, the initial offset vector may be directly determined as the target offset vector.

1203: When a value of a component of the initial offset vector in the first direction falls outside the first value range and/or a value of a component of the initial offset vector in the second direction falls outside the second value range, perform clipping on a part that is of the value of the component of the initial offset vector in the first direction and that exceeds the first value range and/or a part that is of the value of the component of the initial offset vector in the second direction and that exceeds the second value range, and determine an initial offset vector obtained after the clipping as the target offset vector.

Values of components that are of the initial offset vector obtained after the clipping in step 1203 and that are in the first direction and the second direction respectively fall within the first value range and the second value range.

Specifically, when the value of the component of the initial offset vector in the first direction falls outside the first value range and/or the value of the component of the initial offset vector in the second direction falls outside the second value range, processing on the initial offset vector includes Case 1 to Case 3. The following describes the three cases in detail.

Case 1:

When the value of the component of the initial offset vector in the first direction falls within the first value range, and the value of the component of the initial offset vector in the second direction exceeds the second value range, clipping is performed on the part that is of the component of the initial offset vector in the second direction and that exceeds the second value range, and an initial offset vector obtained after the clipping is determined as the target offset vector.

For example, the first value range is [the first threshold, the second threshold], the second value range is [the third threshold, the fourth threshold], and the components of the initial offset vector in the first direction and the second direction are a first component and a second component. The first component is less than the second threshold and greater than the first threshold, and the second component is greater than the fourth threshold. In this case, the second component of the initial offset vector falls outside the value range limited by [the third threshold, the fourth threshold], and clipping (which may be alternatively referred to as truncation) needs to be performed on a part that is of a value of the second component and that exceeds the fourth threshold, so that a second component obtained after the clipping is greater than or equal to the third threshold and less than or equal to the fourth threshold.

Case 2:

When the value of the component of the initial offset vector in the first direction exceeds the first value range, and the value of the component of the initial offset vector in the second direction falls within the second value range, clipping is performed on the part that is of the component of the initial offset vector in the first direction and that exceeds the first value range, and an initial offset vector obtained after the clipping is determined as the target offset vector.

For example, the first value range is [the first threshold, the second threshold], the second value range is [the third threshold, the fourth threshold], and the components of the initial offset vector in the first direction and the second direction are a first component and a second component. The second component is greater than the third threshold and less than the fourth threshold, and the first component is less than the first threshold. In this case, the first component of the initial offset vector falls outside the value range limited by [the first threshold, the second threshold], and a value of the first component needs to be clipped into the value range limited by [the first threshold, the second threshold], that is, a difference between the first threshold and the first component needs to be added to the first component, so that a first component obtained after the clipping falls within the first value range.

Case 3:

When the value of the component of the initial offset vector in the first direction exceeds the first value range, and the value of the component of the initial offset vector in the second direction exceeds the second value range, clipping is performed on the part that is of the component of the initial offset vector in the first direction and that exceeds the first value range, clipping is performed on the part that is of the component of the initial offset vector in the second direction and that exceeds the second value range, and an initial offset vector obtained after the clipping is determined as the target offset vector.

For example, the first value range is [the first threshold, the second threshold], the second value range is [the third threshold, the fourth threshold], and the components of the initial offset vector in the first direction and the second direction are a first component and a second component. The first component is greater than the second threshold, and the second component is greater than the fourth threshold. In this case, the first component of the initial offset vector falls outside the value range limited by [the first threshold, the second threshold], the second component of the initial offset vector falls outside the value range limited by [the third threshold, the fourth threshold], clipping needs to be performed on a part that is of a value of the first component and that exceeds the second threshold, and clipping needs to be performed on a part that is of a value of the second component and that exceeds the fourth threshold, so that a value of a first component obtained after the clipping falls within the range [the first threshold, the second threshold], and a value of a second component obtained after the clipping falls within the range [the third threshold, the fourth threshold].

A second manner includes: determining, as the target offset vector, a motion vector that is in motion vectors of spatially neighboring blocks of the to-be-processed block and whose component values in the first direction and the second direction meet a requirement.

Specifically, in the second manner, determining of the target offset vector includes step 1204 and step 1205. The following describes step 1204 and step 1205 in detail.

1204: Determine a target spatially neighboring block in preset spatially neighboring blocks of the to-be-processed block, where a value of a component of a motion vector of the target spatially neighboring block in the first direction falls within the first value range, and a value of a component of the motion vector of the target spatially neighboring block in the second direction falls within the second value range.

Specifically, in step 1204, the motion vectors of the spatially neighboring blocks of the to-be-processed block may be obtained in a specific order, then whether component values of the motion vectors of the spatially neighboring blocks in the first direction and the second direction respectively fall within the first value range and the second value range is determined, and a motion vector whose component values in the first direction and the second direction respectively fall within the first value range and the second value range is determined as the target offset vector.

1205: Use the motion vector of the target spatially neighboring block as the target offset vector.

For example, as shown in FIG. 4, a motion vector of the first available neighboring block may be found in an order of $A_1$, $B_1$, $B_0$, and $A_0$. Then, whether component values of the motion vector meet a requirement (which is that component values in the first direction and the second direction respectively fall within the first value range and the second value range) is determined. If the motion vector meets the requirement, the motion vector is determined as the target offset vector. If the motion vector does not meet the requirement, a motion vector of a next available neighboring block continues to be searched for in the order of $A_1$, $B_1$, $B_0$, and $A_0$. Then, whether the requirement is met is determined, until a motion vector that meets the requirement is found.

It should be understood that the target offset vector used in step 120 may alternatively be a zero offset vector. In this case, a picture block that is in the target picture and that is inside a same location as the to-be-processed block is the corresponding block that is of the to-be-processed block and that is in the target picture.

In addition, when no target offset vector that meets the requirement can be found, an ATMVP technology may alternatively not be used, but another technology is used to obtain a motion vector of the to-be-processed sub-block.

130: Determine, in the target picture based on a location of the to-be-processed sub-block and the target offset vector, a collocated sub-block of the to-be-processed sub-block.

Because the target offset vector points to the corresponding block that is of the to-be-processed block and that is in the target picture, the corresponding block may be first obtained based on the offset vector, and then the collocated sub-block having a relative location relationship with the to-be-processed sub-block is determined in the target picture based on the location of the to-be-processed sub-block (this may also be understood as that the collocated sub-block having the relative location relationship with the to-be-processed sub-block is determined in the corresponding block).

When the collocated sub-block having the relative location relationship with the to-be-processed sub-block is determined in the corresponding block, a sub-block that is in the corresponding block and whose relative location is the same as that of the to-be-processed sub-block may be determined as the collocated sub-block of the to-be-processed sub-block.

Figure 5:
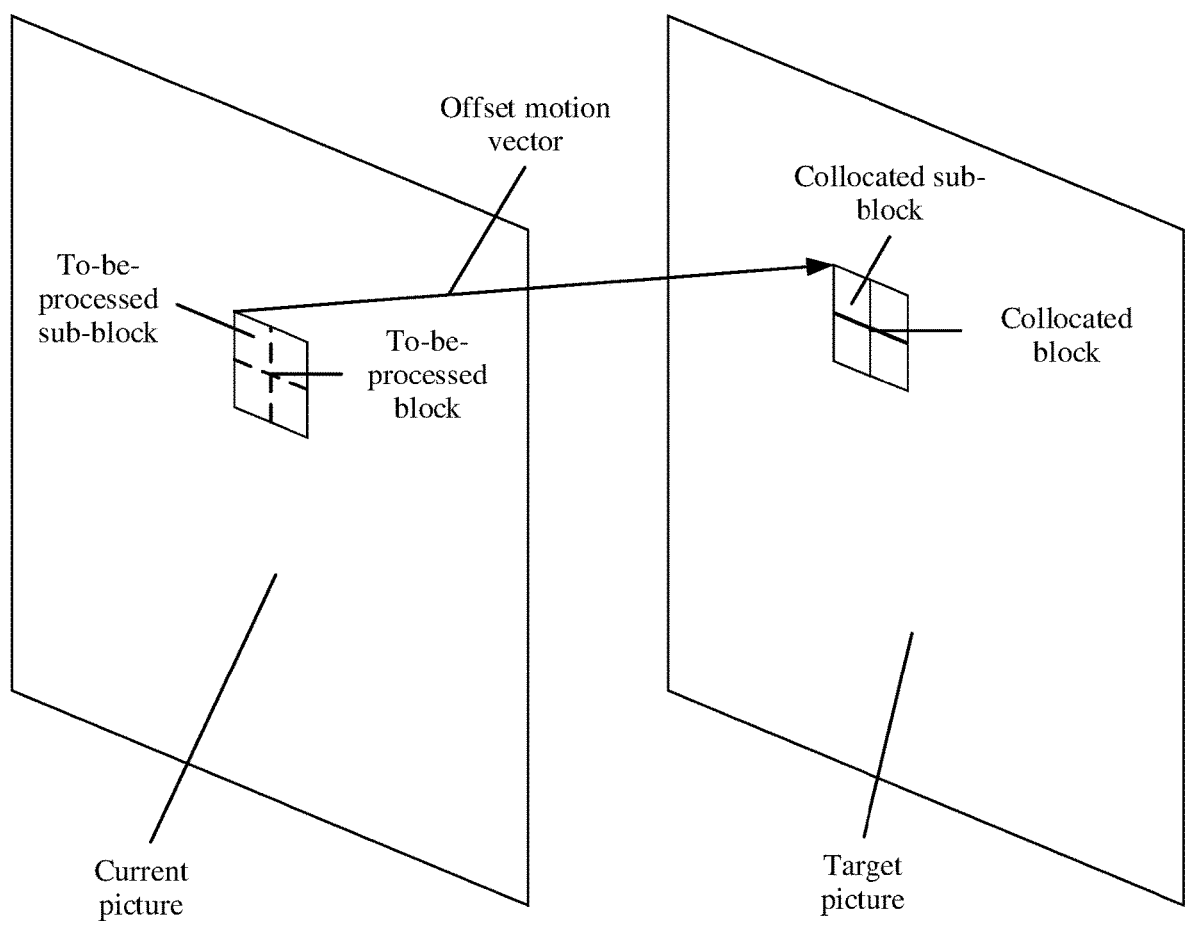
FIG. 5 is a schematic diagram of a to-be-processed sub-block included in a current picture and a collocated sub-block in a target picture.

For example, as shown in FIG. 5, a current picture includes a to-be-processed block, and the to-be-processed block includes four sub-blocks. A corresponding block that is in a target picture and that corresponds to the to-be-processed block may be obtained based on a location of the to-be-processed block and an offset vector of the to-be-processed block. The corresponding block also includes four sub-blocks. A to-be-processed sub-block is located at the top-left corner of the to-be-processed block. In this case, when a collocated sub-block of the to-be-processed sub-block is determined, a top-left sub-block of the corresponding block may be determined as the collocated sub-block of the to-be-processed sub-block.

140: Determine a motion vector of the to-be-processed sub-block based on a motion vector of the collocated sub-block.

In this application, because the component value of the target offset vector falls within a specific value range, the to-be-processed sub-block determined in the target picture based on the target offset vector also falls within a specific range of the target picture. Therefore, memory bandwidth and a quantity of memory read times can be reduced by pre-reading a temporal motion vector field in the specific range of the target picture.

Optionally, before step 140, the method shown in FIG. 3 further includes: obtaining a motion vector of a sample in a preset area in the target picture, where the preset area is an area in which the collocated sub-block of the to-be-processed sub-block may appear.

In this application, because an area in which the collocated sub-block appears in the target picture is determined, a quantity of times of reading a motion vector from the target picture can be reduced by pre-obtaining a motion vector in a specific area in the target picture. In other words, a quantity of memory read times is reduced. In addition, because the motion vector in only the specific area in the target picture is obtained, memory bandwidth can be reduced.

After the motion vector of the collocated sub-block is obtained, the motion vector of the to-be-processed sub-block may be obtained by scaling the motion vector of the collocated sub-block.

Specifically, the determining a motion vector of the to-be-processed sub-block based on a motion vector of the collocated sub-block includes: scaling the motion vector of the collocated sub-block based on a picture order count (picture order count, POC) of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

Figure 6:
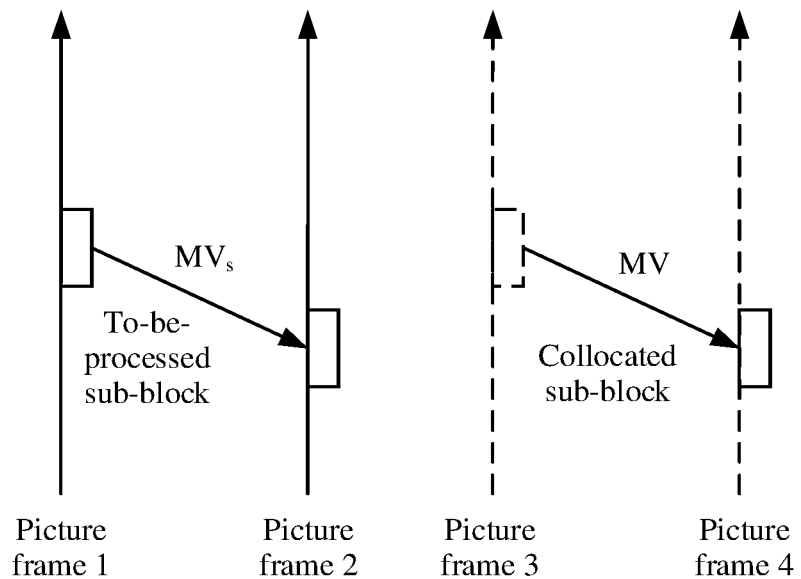
FIG. 6 is a schematic diagram of a motion vector of a to-be-processed sub-block and a motion vector of a collocated sub-block.

For example, as shown in FIG. 6, the picture including the to-be-processed sub-block is a picture frame 1, a target reference picture of the picture frame 1 is a picture frame 2, the picture frame in which the target picture is located is a picture frame 3, a target reference picture of the picture frame 3 is a picture frame 4, and the motion vector of the collocated sub-block is MV. In this case, MV may be scaled based on POCs of the picture frame 1 to the picture frame 4, to obtain the motion vector of the to-be-processed sub-block.

Optionally, the scaling the motion vector of the collocated sub-block based on a POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block includes: determining a difference between the POC of the picture including the to-be-processed sub-block and the POC of the target reference picture of the picture including the to-be-processed sub-block as a first difference; determining a difference between the POC of the target picture and the POC of the target reference picture of the target picture as a second difference; and scaling the motion vector of the collocated sub-block based on a ratio of the first difference to the second difference, to obtain the motion vector of the to-be-processed sub-block.

When the motion vector of the collocated sub-block is scaled based on the ratio of the first difference to the second difference, to obtain the motion vector of the to-be-processed sub-block, specifically, the ratio of the first difference to the second difference may be first calculated to obtain a first ratio, and then a product of the first ratio and the motion vector of the collocated sub-block is determined as the motion vector of the to-be-processed sub-block.

Specifically, FIG. 6 is still used as an example. The motion vector of the to-be-processed sub-block may be calculated according to a formula (1):

$$MV_s = \frac{P1 - P2}{P3 - P4} \times MV \qquad (1)$$

Herein, $MV_s$ is the motion vector of the to-be-processed sub-block, MV is the motion vector of the collocated sub-block, P1 to P4 are the POCs of the picture frame 1 to the picture frame 4, P1-P2 represents the first difference, and P3-P4 represents the second difference.

Optionally, in an embodiment, the determining a first value range and a second value range includes: determining the first value range and the second value range based on a location and a size of the to-be-processed block, a location and a size of a coding tree unit CTU in which the to-be-processed block is located, and a preset extension range of a temporal motion vector field of the CTU.

It should be understood that the first value range and the second value range may be determined by determining a maximum value and a minimum value available to the target offset vector in each of the first direction and the second direction. The following provides detailed descriptions of determining the first value range and the second value range in this manner.

Specifically, the determining the first value range and the second value range includes the following process:

(1) Determine the first threshold and the second threshold based on the location and the size of the to-be-processed block, the location and the size of the coding tree unit CTU in which the to-be-processed block is located, and the preset extension range of the temporal motion vector field of the CTU.

(2) Determine the third threshold and the fourth threshold based on the location and the size of the to-be-processed block, the location and the size of the coding tree unit CTU in which the to-be-processed block is located, and the preset extension range of the temporal motion vector field of the CTU.

(3) Obtain the first value range based on the first threshold and the second threshold.

(4) Obtain the second value range based on the third threshold and the fourth threshold.

The first threshold is a minimum value available to the component of the target offset vector in the first direction, and the second threshold is a maximum value available to the component of the target offset vector in the first direction. The third threshold is a minimum value available to the component of the target offset vector in the second direction, and the fourth threshold is a maximum value available to the component of the target offset vector in the second direction.

Optionally, in an embodiment, the extension range of the temporal motion vector field of the CTU includes extension ranges of the temporal motion vector field of the CTU in the first direction and the second direction.

The first direction and the second direction are two directions in an orthogonal relationship.

Optionally, the first direction may be a horizontal direction, and the second direction may be a vertical direction.

It should be understood that, when the first direction is the horizontal direction, and the second direction is the vertical direction, the extension range of the temporal motion vector field of the CTU includes extension values of the temporal motion vector field of the CTU in an upward direction, a downward direction, a left direction, and a right direction.

Figure 7:
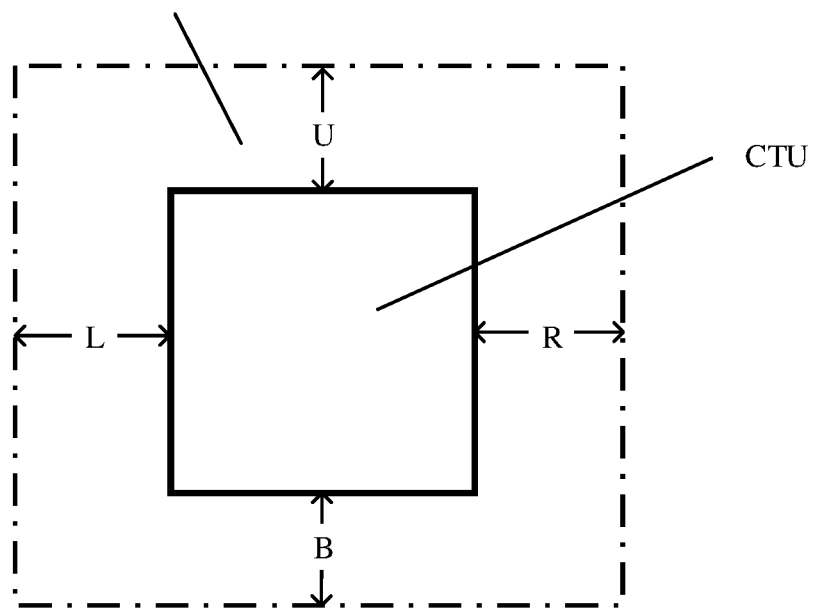
FIG. 7 is a schematic diagram of an extension range of a temporal motion vector field of a CTU.

For example, as shown in FIG. 7, an area enclosed by a dashed line and a rectangle in which the CTU is located is the extension range of the temporal motion vector field of the CTU, and the extension values of the temporal motion vector field of the CTU in the upward direction, the downward direction, the left direction, and the right direction are respectively U, B, L, and R.

When U, B, L, and R are all 0, it indicates that an extension value of the CTU in each direction is 0. In this case, a temporal motion vector field of a current CTU is limited to a temporal motion vector field of a CTU at a corresponding location.

Figure 8:
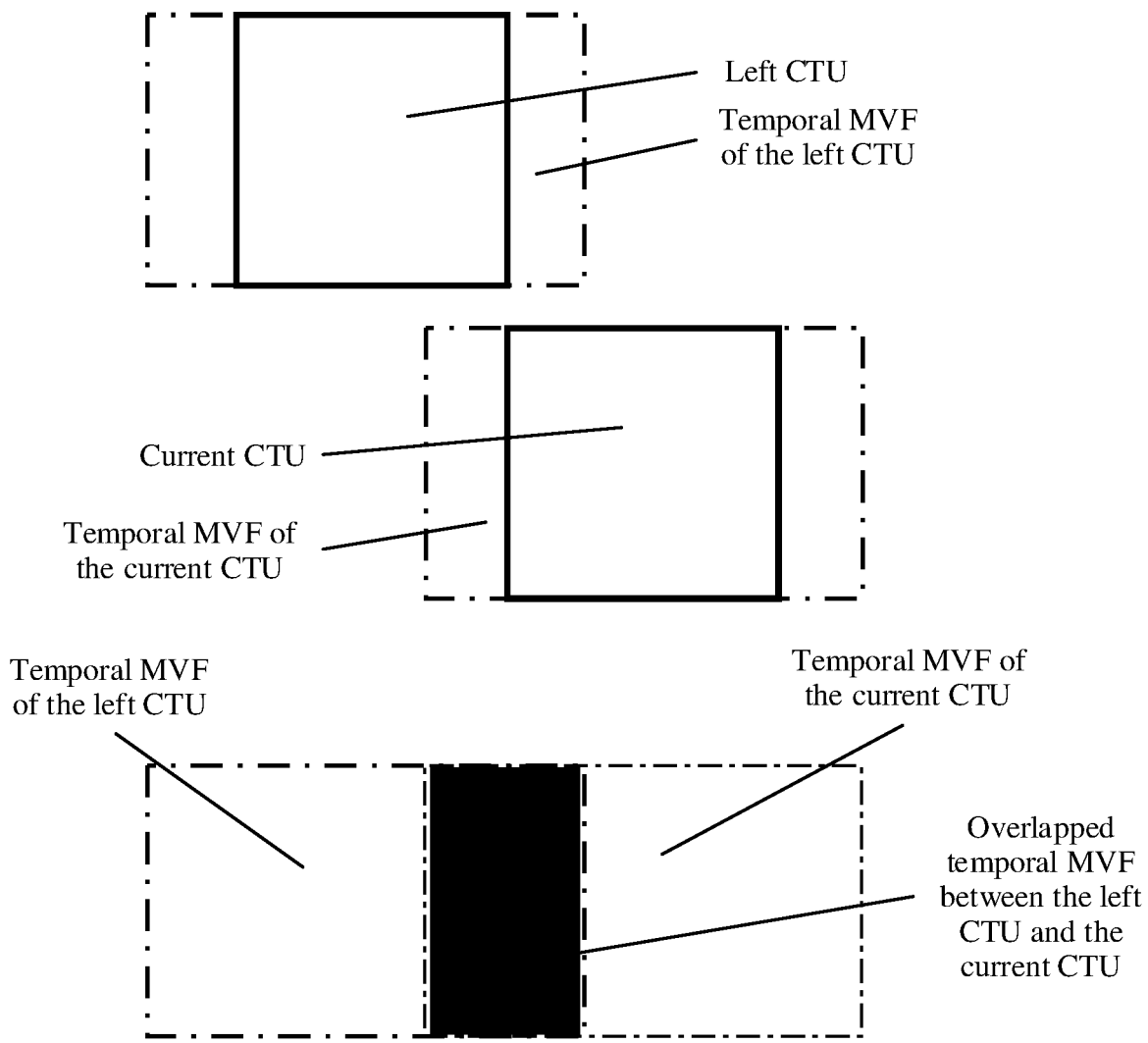
FIG. 8 is a schematic diagram of extension ranges of temporal motion vector fields of a current CTU and a left CTU.

When U and B are 0 but L or R is not 0, a temporal motion vector field obtained by a current CTU cannot cross the top boundary or the bottom boundary of the CTU, but can cross the left boundary and the right boundary of the CTU. As shown in FIG. 8, a motion vector field (MVF) of the current CTU and an MVF of a left CTU can be extended leftward and rightward, but cannot be extended upward or downward. The temporal motion vector field of the current CTU and the temporal motion vector field of the left CTU partially overlap. In this case, when the current CTU is processed, the temporal motion vector field that has been read by the CTU on the left of the current CTU may be partially reused through window sliding.

Specifically, the first value range and the second value range may be determined according to a formula (2) to a formula (5):

$$\text{HorMin} = \text{CTUX} - \text{CUX} - L \qquad (2)$$

$$\text{HorMax} = \text{CTUX} + \text{CTUW} - \text{CUX} - \text{CUW} + R \qquad (3)$$

$$\text{VerMin} = \text{CTUY} - \text{CUY} - U \qquad (4)$$

$$\text{VerMax} = \text{CTUY} + \text{CTUH} - \text{CUY} - \text{CUH} + B \qquad (5)$$

Herein, CUX and CUY respectively represent a horizontal coordinate and a vertical coordinate of a top-left sample of the to-be-processed block, CUW and CUH represent the width and the height of the to-be-processed block, CTUX and CTUY respectively represent a horizontal coordinate and a vertical coordinate of the CTU in which the to-be-processed block is located, CTUW and CTUH are respectively the width and the height of the CTU in which the to-be-processed block is located, U, B, L, and R respectively represent the extension values of the CTU in the upward direction, the downward direction, the left direction, and the right direction, HorMin and HorMax respectively represent the first threshold and the second threshold, and VerMin and VerMax respectively represent the third threshold and the fourth threshold.

Optionally, information about the extension range of the temporal motion vector field of the CTU is carried in at least one of a sequence parameter set SPS, a picture parameter set PPS, and a header field.

It should be understood that the SPS, the PPS, and the header field each may indicate the extension range of the CTU by using carried parameters (U, B, L, and R).

Optionally, the extension range of the temporal motion vector field of the CTU is preset. In this case, the extension range of the temporal motion vector field of the CTU may be directly written into a protocol, and does not need to be carried in the SPS, the PPS, or the header field.

Figure 9:
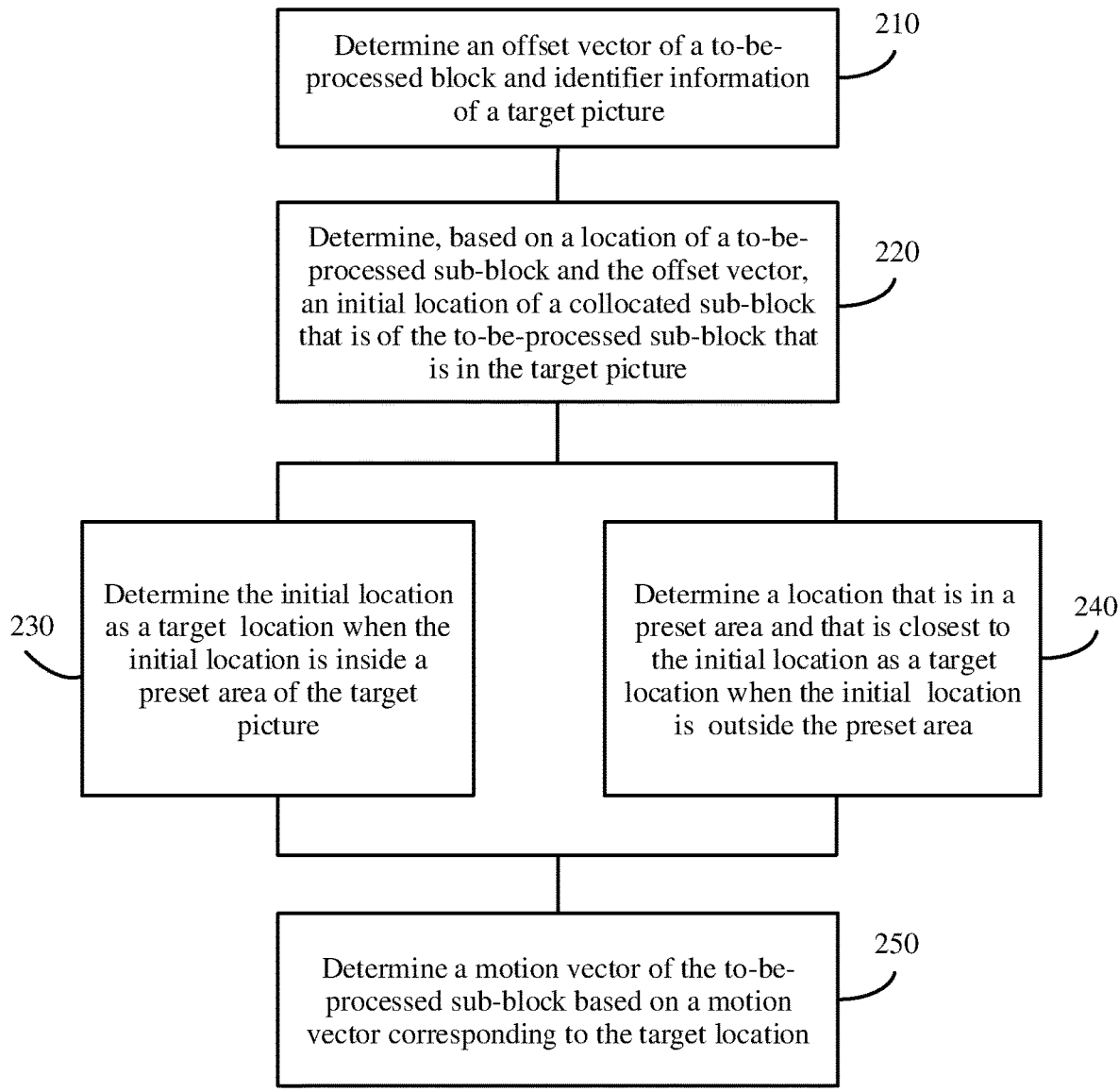
FIG. 9 is a schematic flowchart of a motion vector obtaining method according to an embodiment of this application.

FIG. 9 is a schematic flowchart of a motion vector obtaining method according to an embodiment of this application. The method shown in FIG. 9 may be performed by a video encoding and decoding apparatus, a video codec, a video encoding and decoding system, and another device having a video encoding and decoding function.

The method shown in FIG. 9 includes step 210 to step 250. The following describes step 210 to step 250 in detail.

210: Determine a target offset vector of a to-be-processed block and identifier information of a target picture.

The to-be-processed block includes at least one to-be-processed sub-block. When a motion vector of the to-be-processed block is obtained, a motion vector of each to-be-processed sub-block of the to-be-processed block actually needs to be obtained. When the to-be-processed block is a CU, the to-be-processed sub-block is a sub-CU.

The target offset vector in step 210 has a same meaning as the target offset vector mentioned in the method shown in FIG. 3, and details are not described herein again.

The identifier information of the target picture may be specifically a POC of the target picture in the picture sequence, or may be index information or an index value of the target picture.

220: Determine, based on a location of the to-be-processed sub-block and the target offset vector, an initial location of a collocated sub-block that is of the to-be-processed sub-block and that is in the target picture.

Specifically, when the initial location of the collocated sub-block that is of the to-be-processed sub-block and that is in the target picture is determined, a collocated sub-block of the to-be-processed sub-block may be first determined, and then a specified location on the collocated sub-block is determined as the initial location of the collocated sub-block that is of the to-be-processed sub-block and that is in the target picture. For example, after the collocated sub-block is determined, the center point or the top-left corner of the collocated sub-block may be determined as the initial location of the collocated sub-block that is of the to-be-processed sub-block and that is in the target picture.

For a manner of determining the collocated sub-block, refer to the descriptions in the related paragraphs below step 130 in the method shown in FIG. 3.

In addition, when the initial location of the collocated sub-block that is of the to-be-processed sub-block and that is in the target picture is determined, the collocated sub-block may alternatively not be determined, but a location that is in the target picture and that corresponds to the to-be-processed sub-block is directly determined, based on the location of the to-be-processed sub-block and the target offset vector, as the initial location of the collocated sub-block that is of the to-be-processed sub-block and that is in the target picture. For example, a specified location, such as the center point or the top-left corner, of the to-be-processed sub-block is first determined, and the target offset vector is added to coordinates of the location, so that the initial location of the collocated sub-block that is of the to-be-processed sub-block and that is in the target picture can be determined.

230: Determine the initial location as a target location when the initial location is inside a preset area of the target picture.

Figure 10:
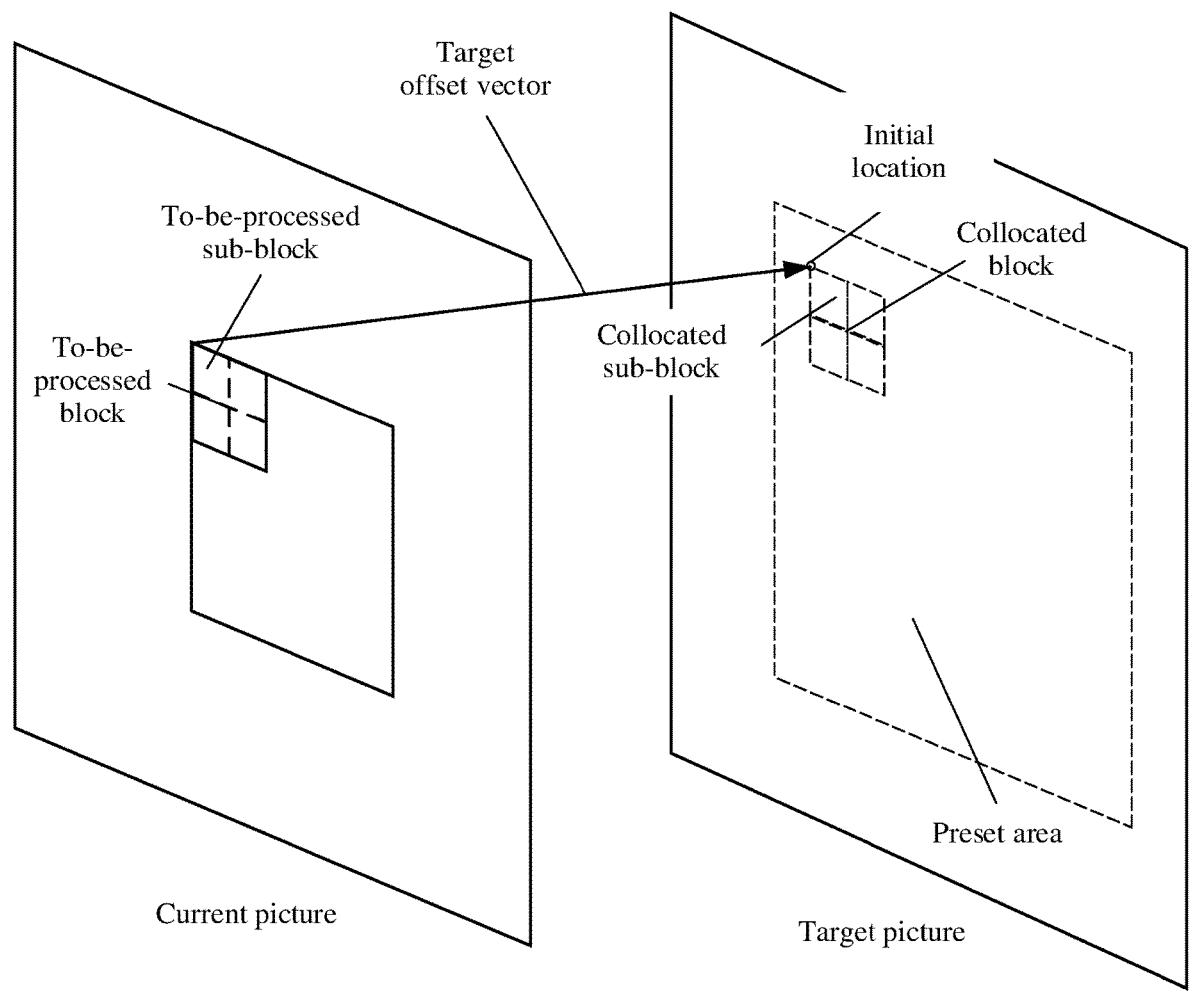
FIG. 10 is a schematic diagram of determining an initial location of a to-be-processed sub-block.

For example, as shown in FIG. 10, a current picture includes a to-be-processed block, the to-be-processed block includes a top-left to-be-processed sub-block, a target picture includes a corresponding block, the corresponding block includes a top-left collocated sub-block, a target offset vector of the to-be-processed block points to the corresponding block, and a rectangular area in a dashed-line box in the target picture is a preset area of the target picture. It can be learned from FIG. 10 that an initial location of the collocated sub-block that is of the to-be-processed sub-block and that is in the target picture is inside the preset area of the target picture, and the initial location may be directly determined as a target location.

240: Determine a location that is in a preset area and that is closest to the initial location as a target location when the initial location is outside the preset area.

Figure 11:
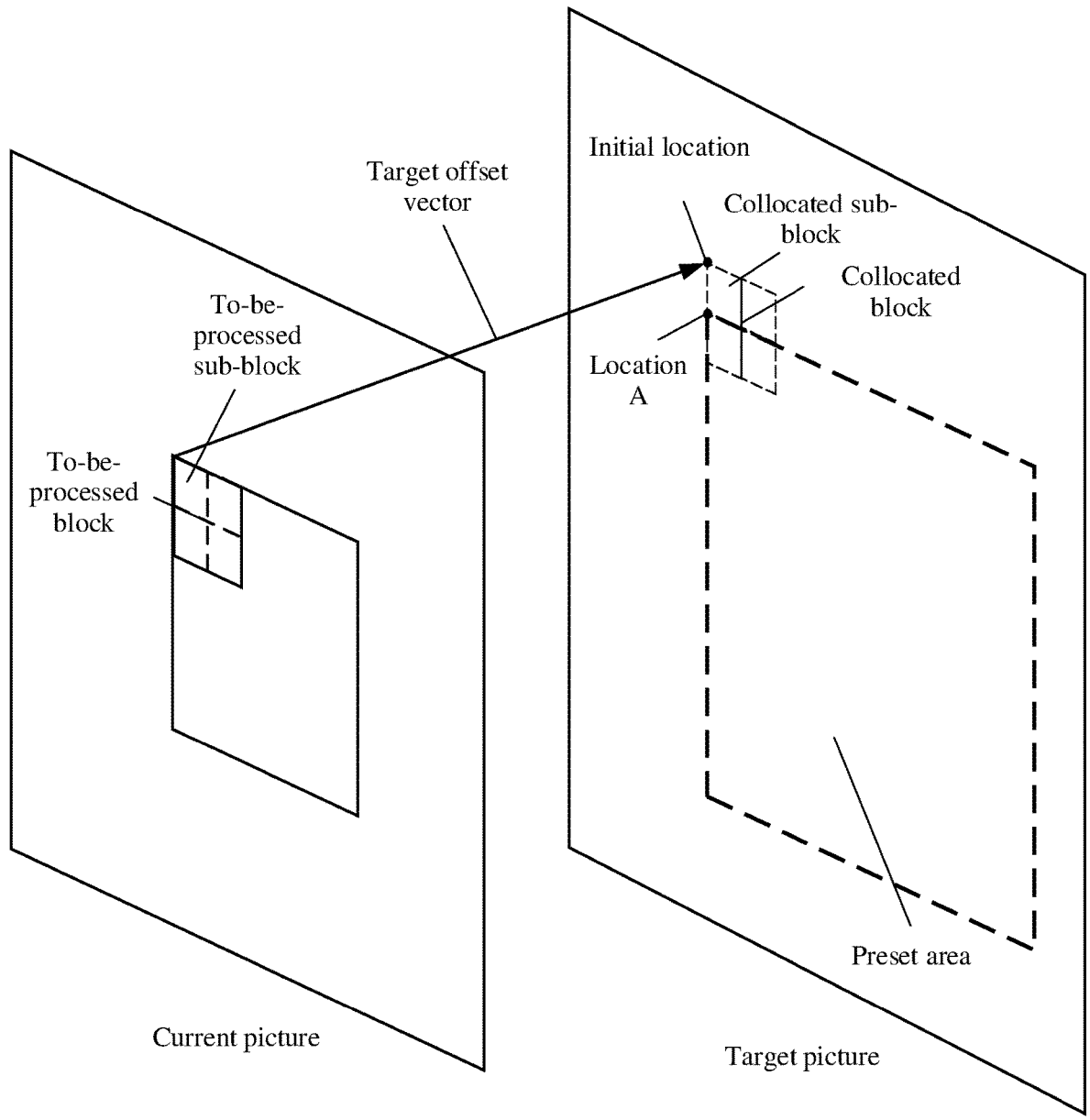
FIG. 11 is a schematic diagram of determining a target location.

For example, as shown in FIG. 11, a current picture includes a to-be-processed block, the to-be-processed block includes a top-left to-be-processed sub-block, a target picture includes a corresponding block, the corresponding block includes a top-left collocated sub-block, a target offset vector of the to-be-processed block points to the corresponding block, and a rectangular area in a dashed-line box in the target picture is a preset area of the target picture. It can be learned from FIG. 11 that an initial location of the collocated sub-block that is of the to-be-processed sub-block and that is in the target picture is outside the preset area of the target picture. In this case, a location A that is in the preset area and that is closest to the initial location needs to be determined as a target location.

250: Determine a motion vector of the to-be-processed sub-block based on a motion vector corresponding to the target location.

In this application, the target location inside the preset area is found based on the initial location and the preset area of the target picture, and then the motion vector of the to-be-processed sub-block is determined based on a motion vector in a specific range of the target picture. Therefore, memory bandwidth and a quantity of memory read times can be reduced by pre-reading a temporal motion vector field in the specific range of the target picture.

Optionally, before step 250, the method shown in FIG. 9 further includes: obtaining a motion vector of a sample in the preset area in the target picture.

It should be understood that, before the motion vector of the to-be-processed sub-block is determined based on the motion vector of the target location in step 250, the motion vector corresponding to the target location needs to be first obtained. To reduce a quantity of memory read times and occupied memory bandwidth, the motion vector of the sample in the preset area of the target picture may be obtained in advance. In this way, when the motion vector of the target location needs to be used, the motion vector corresponding to the target location may be directly obtained from the read motion vector of the sample in the preset area. In addition, because the motion vector of the sample in only the preset area of the target picture is obtained, different from that in a conventional solution in which motion vectors of samples in the entire target picture possibly need to be obtained, occupied memory bandwidth can be reduced.

Optionally, in an embodiment, the preset area in step 230 is determined based on a location and a size of a coding tree unit CTU in which the to-be-processed block is located, a size of the target picture, and a preset extension range of a temporal motion vector field of the CTU.

The extension range of the temporal motion vector field of the CTU includes extension ranges of the temporal motion vector field of the CTU in a first direction and a second direction.

Optionally, the first direction is a horizontal direction, and the second direction is a vertical direction.

Optionally, when the first direction is the horizontal direction, and the second direction is the vertical direction, the extension range of the temporal motion vector field of the CTU includes extension ranges of the temporal motion vector field of the CTU in an upward direction, a downward direction, a left direction, and a right direction.

The preset area may be limited in a plurality of manners. For example, optionally, the preset area may be represented by using a horizontal coordinate value range and a vertical coordinate value range.

Specifically, the preset area may be represented by a horizontal coordinate value range [a minimum horizontal coordinate value, a maximum horizontal coordinate value] and a vertical coordinate value range [a minimum vertical coordinate value, a maximum vertical coordinate value].

Values in the horizontal coordinate value range and the vertical coordinate value range may be calculated according to a formula (6) to a formula (9):

$$\text{HorMin} = \text{Max}(CTUX - L, 0) \tag{6}$$

$$\text{HorMax} = \text{Min}(CTUX + CTUW + R - 1, PicW - 1) \tag{7}$$

$$\text{VerMin} = \text{Max}(CTUY - U, 0) \tag{8}$$

$$\text{VerMax} = \text{Min}(CTUY + CTUH + B - 1, PicH - 1) \tag{9}$$

Herein, CTUX is a horizontal coordinate of the CTU in which the to-be-processed block is located, CTUY is a vertical coordinate of the CTU in which the to-be-processed block is located, CTUW and CTUH are respectively the width and the height of the CTU in which the to-be-processed block is located, PicW and PicH are respectively the width and the height of the target picture, U, B, L, and R respectively represent extension values of the CTU in an upward direction, a downward direction, a left direction, and a right direction, HorMin and HorMax are respectively the minimum horizontal coordinate value and the maximum horizontal coordinate value, and VerMin and VerMax are respectively the minimum vertical coordinate value and the maximum vertical coordinate value.

After the minimum horizontal coordinate value, the maximum horizontal coordinate value, the minimum vertical coordinate value, and the maximum vertical coordinate value are obtained through calculation according to the formula (6) to the formula (9), the horizontal coordinate value range and the vertical coordinate value range can be obtained, and the preset area of the target picture is determined.

Optionally, information about the extension range of the temporal motion vector field of the CTU is carried in at least one of an SPS, a PPS, and a header field.

Alternatively, the extension range of the temporal motion vector field of the CTU may be preset. In this case, the extension range of the motion vector of the CTU may be directly written into a protocol, and does not need to be carried in the SPS, the PPS, or the header field.

Optionally, in an embodiment, the determining a motion vector of the to-be-processed sub-block based on a motion vector corresponding to the target location includes: scaling the motion vector corresponding to the target location based on a POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

Specifically, when the motion vector corresponding to the target location is scaled based on the POC of the picture including the to-be-processed sub-block, the POC of the target reference picture of the picture including the to-be-processed sub-block, the POC of the target picture, and the POC of the target reference picture of the target picture, to obtain the motion vector of the to-be-processed sub-block, a difference between the picture order count POC of the picture including the to-be-processed sub-block and the POC of the target reference picture of the picture including the to-be-processed sub-block may be first determined as a third difference, a difference between the POC of the target picture and the POC of the target reference picture of the target picture is determined as a fourth difference, and then the motion vector corresponding to the target location is scaled based on a ratio of the third difference to the fourth difference, to obtain the motion vector of the to-be-processed sub-block.

Optionally, that the motion vector of the collocated sub-block is scaled based on the ratio of the third difference to the fourth difference, to obtain the motion vector of the to-be-processed sub-block includes: determining the ratio of the third difference to the fourth difference as a second ratio; and determining a product of the second ratio and the motion vector corresponding to the target location as the motion vector of the to-be-processed sub-block.

Figure 12:
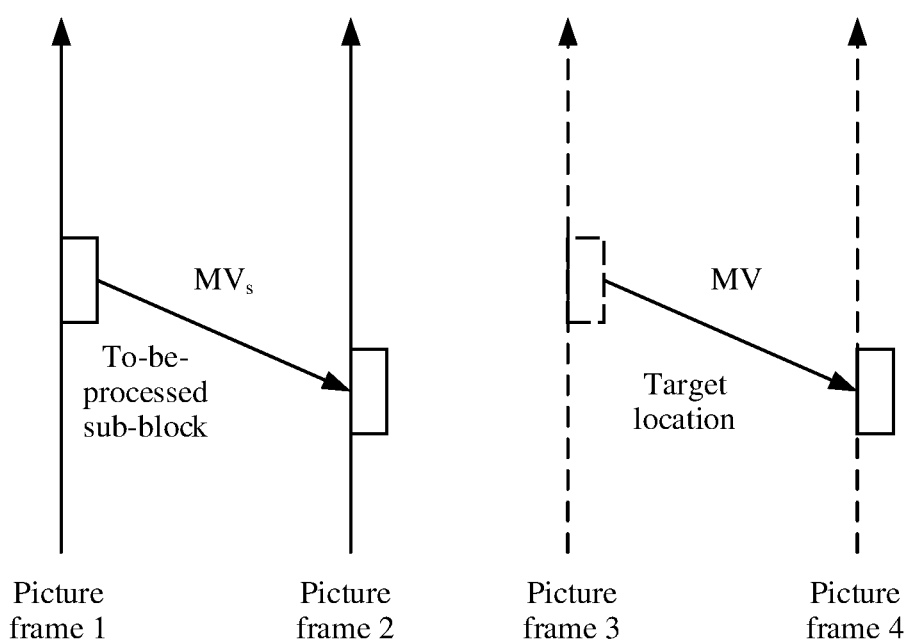
FIG. 12 is a schematic diagram of a motion vector of a to-be-processed sub-block and a motion vector of a target location.

For example, as shown in FIG. 12, the picture including the to-be-processed sub-block is a picture frame 1, a target reference picture of the picture frame 1 is a picture frame 2, the picture frame in which the target picture is located is a picture frame 3, a target reference picture of the picture frame 3 is a picture frame 4, and the motion vector of the target location is MV. In this case, MV may be scaled based on POCs of the picture frame 1 to the picture frame 4, to obtain the motion vector of the to-be-processed sub-block.

Specifically, the motion vector of the to-be-processed sub-block may be calculated according to a formula (10):

$$MV_s = \frac{P1 - P2}{P3 - P4} \times MV \tag{10}$$

Herein, $MV_s$ is the motion vector of the to-be-processed sub-block, MV is the motion vector of the target location, P1 to P4 are the POCs of the picture frame 1 to the picture frame 4, P1-P2 represents the third difference, and P3-P4 represents the fourth difference.

To implement prediction for the to-be-processed block, the to-be-processed block may be predicted after motion vectors of all to-be-processed sub-blocks of the to-be-processed block are obtained, to obtain a predicted sample value of the to-be-processed block. Alternatively, after a motion vector of each to-be-processed sub-block is obtained, the to-be-processed sub-block may be predicted to obtain a predicted sample value of each to-be-processed sub-block, and after all to-be-processed sub-blocks are predicted, a predicted sample value of the to-be-processed block is obtained.

The foregoing describes the motion vector obtaining method in the embodiments of this application with reference to FIG. 3 to FIG. 12. To better understand the technical solutions of this application, the following describes the motion vector obtaining method in the embodiments of this application in detail with reference to specific embodiments.

Embodiment 1 and Embodiment 2 correspond to the method shown in FIG. 3, and a value of a target offset vector is limited, so that a finally found collocated sub-block is inside a specific area of a target picture. In Embodiment 3, no limitation is imposed on a value of a target offset vector, but a target location of a collocated sub-block that is of a to-be-processed sub-block and that is in a target picture is directly limited to a specific area. Finally, in all of Embodiment 1 to Embodiment 3, a motion vector of a to-be-processed sub-block is determined based on a motion vector of a sample in a specific area of a target picture. The following separately describes Embodiment 1 to Embodiment 3 in detail.

Embodiment 1

Figure 13:
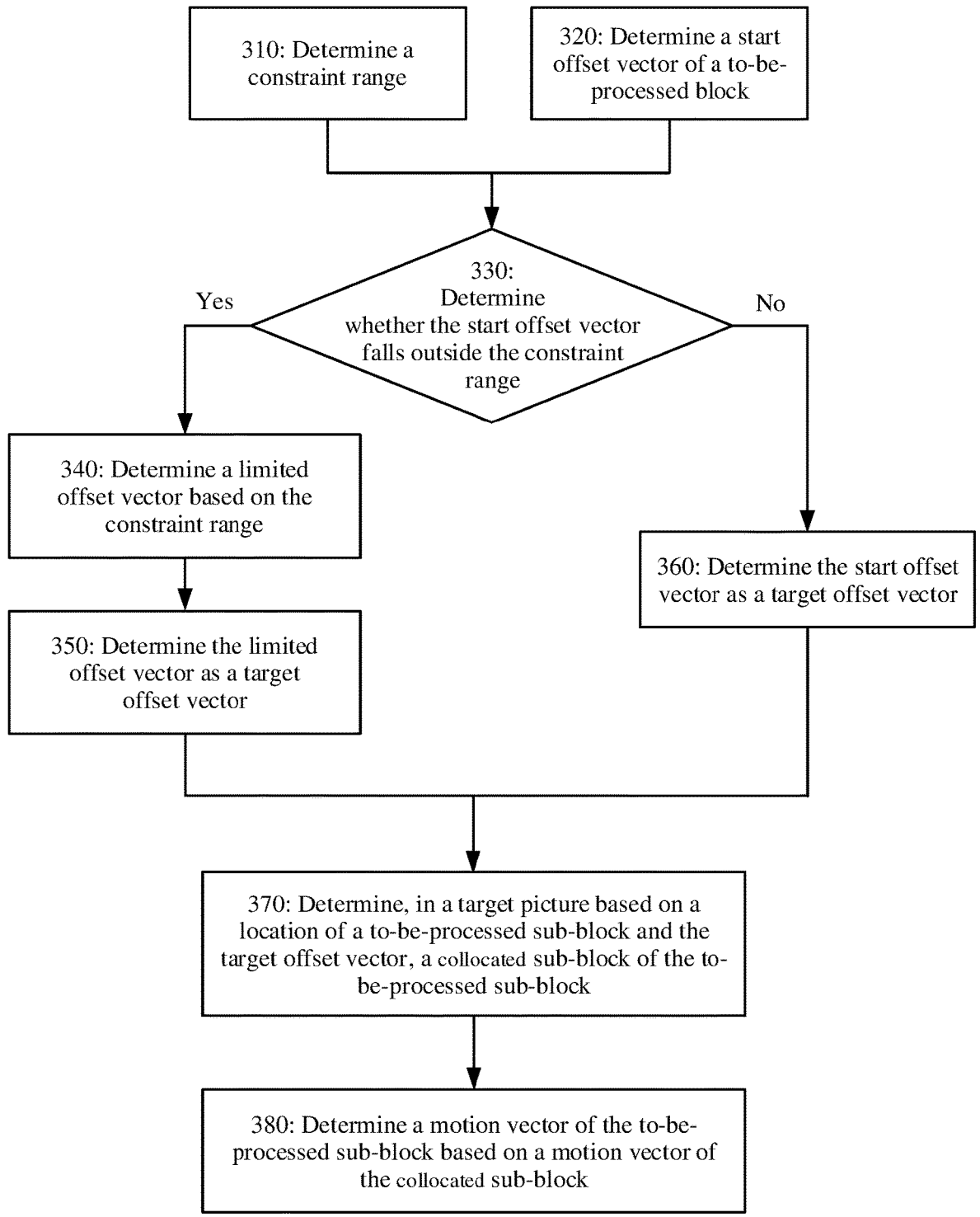
FIG. 13 is a flowchart of a motion vector obtaining method according to an embodiment of this application.

As shown in FIG. 13, a specific motion vector obtaining process in Embodiment 1 includes the following steps.

310: Determine a constraint range.

The constraint range herein is equivalent to the first value range and the second value range above.

It should be understood that the constraint range is determined to constrain values of components of a target offset vector of a to-be-processed block in a first direction and a second direction, so that the values of the components of the target offset vector in the first direction and the second direction fall within the constraint range.

Optionally, the constraint range may be determined based on an extension range of a temporal motion vector field of a CTU, a location and a size of the to-be-processed block, and a location and a size of the CTU in which the to-be-processed block is located.

The extension range of the temporal motion vector field of the CTU may be defined by using parameters RangeL, RangeR, RangeU, and RangeB (which are equivalent to the foregoing parameters L, R, U, and B), and the parameters RangeL, RangeR, RangeU, and rangeB respectively represent extension values of the temporal motion vector field of the CTU in four directions: a left direction, a right direction, an upward direction, and a downward direction.

A value of each of RangeL, RangeR, RangeU, and RangeB may be 0, 16, 32, 64, or the like (a sample is used as a unit).

It should be understood that the foregoing parameters RangeL, RangeR, RangeU, and RangeB may be directly determined in a predefined manner, or may be carried in higher-layer syntax. For example, RangeL, RangeR, RangeU, and RangeB may be carried in an SPS, a PPS, and a header field.

Specifically, the constraint range may be determined according to a formula (11) to a formula (14):

$$\text{HorMin}=\text{CTUX}-\text{CUX}-\text{Range}L \quad (11)$$

$$\text{HorMax}=\text{CTUX}+\text{CTUW}-\text{CUX}-\text{CUW}+\text{Range}R \quad (12)$$

$$\text{VerMin}=\text{CTUY}-\text{CUY}-\text{Range}U \quad (13)$$

$$\text{VerMax}=\text{CTUY}+\text{CTUH}-\text{CUY}-\text{CUH}+\text{Range}B \quad (14)$$

Herein, CUX and CUY represent location coordinates of a top-left sample of the to-be-processed block, CUW and CUH represent the width and the height of the to-be-processed block, CTUX and CTUY represent location coordinates of a top-left sample of the CTU in which the to-be-processed block is located, and CTUW and CTUH represent the width and the height of the CTU. HorMin and HorMax represent a minimum value and a maximum value in the constraint range in a horizontal direction. VerMin and VerMax represent a minimum value and a maximum value in the constraint range in a vertical direction.

320: Determine a start offset vector of the to-be-processed block.

The start offset vector herein is equivalent to the foregoing initial offset vector.

It should be understood that step 310 and step 320 may be simultaneously performed, or may be separately performed in order.

The start offset vector is used to determine a location of a target picture block that is of the to-be-processed block and that is in a target picture, and the start offset vector may be determined in the following two manners.

A third manner includes: determining an available motion vector of a spatially neighboring block of the to-be-processed block as the start offset vector.

Specifically, in the third manner, a motion vector of the first available neighboring block may be found in an order of $A_1$, $B_1$, $B_0$, and $A_0$ in FIG. 4, and is used as the start offset vector of the to-be-processed block.

A fourth manner includes: first determining the target picture, and then determining a motion vector that is of a neighboring block and that points to the target picture as the start offset vector.

Specifically, in the fourth manner, a motion vector of the first available neighboring block may be found in an order of $A_1$, $B_1$, $B_0$, and $A_0$ in FIG. 4, and if the motion vector points to the target picture, the motion vector is used as the start offset vector of the to-be-processed block.

If the motion vector does not point to the target picture, the motion vector is scaled to enable the motion vector to point to the target picture, and a scaled motion vector is used as the start offset vector.

330: Determine whether the start offset vector falls outside the constraint range.

It should be understood that when a value of a component of the start offset vector in at least one of the first direction or the second direction falls outside the constraint range, it is determined that the start offset vector falls outside the constraint range. When a value of a component of the start offset vector in each of the first direction and the second direction does not fall outside the constraint range, it is determined that the start offset vector does not fall outside the constraint range.

When the start offset vector falls outside the constraint range, step 340 and step 350 are performed; or when the start offset vector does not fall outside the constraint range, step 360 is performed.

340: Determine a limited offset vector based on the constraint range.

When the start offset vector falls outside the constraint range, the start offset vector needs to be limited to obtain a limited offset vector, so that the limited offset vector falls within the constraint range.

Specifically, when the start offset vector falls outside the constraint range, components $(x_{off}, y_{off})$ of the start offset vector may be limited according to a formula (15) and a formula (16), to obtain the limited offset vector:

$$x_{off}=\text{Clip3}(\text{HorMin},\text{HorMax},x_{off}) \quad (15)$$

$$y_{off}=\text{Clip3}(\text{VerMin},\text{VerMax},y_{off}) \quad (16)$$

Herein, a Clip3 function is a clipping function, and is specifically defined as follows:

$$\text{Clip3}(x, y, z) = \begin{cases} x; & z < x \\ y; & z > y \\ z; & \text{otherwise} \end{cases} \quad (17)$$

It should be understood that, other than a manner of determining the target offset vector based on the constraint range, alternatively, a zero motion vector may be directly used as the target offset vector. Alternatively, an ATMVP technology may not be used, but another technology is used to obtain a motion vector of a to-be-processed sub-block.

350: Determine the limited offset vector as the target offset vector.

Because the limited offset vector falls within the constraint range, the limited offset vector may be determined as the target offset vector.

360: Determine the start offset vector as the target offset vector.

When the start offset vector falls within the constraint range, no constraint or limitation operation needs to be performed on the start offset vector, and the start offset vector may be directly determined as the target offset vector.

370: Determine, in the target picture based on a location of the to-be-processed sub-block and the target offset vector, a collocated sub-block of the to-be-processed sub-block.

380: Determine the motion vector of the to-be-processed sub-block based on a motion vector of the collocated sub-block.

Specifically, the motion vector of the collocated sub-block may be scaled based on a POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

After the motion vector of the to-be-processed sub-block is obtained, a predicted sample value of the to-be-processed sub-block may be determined based on the motion vector of the to-be-processed sub-block.

When the predicted sample value of the to-be-processed sub-block is determined, a prediction sub-block of the to-be-processed sub-block may be determined based on the motion vector of the to-be-processed sub-block, and then a sample value of the prediction sub-block is determined as the predicted sample value of the to-be-processed sub-block. In this way, after a predicted sample value of each to-be-processed sub-block is obtained, a predicted sample value of the entire to-be-processed block can be obtained.

Embodiment 2

Figure 14:
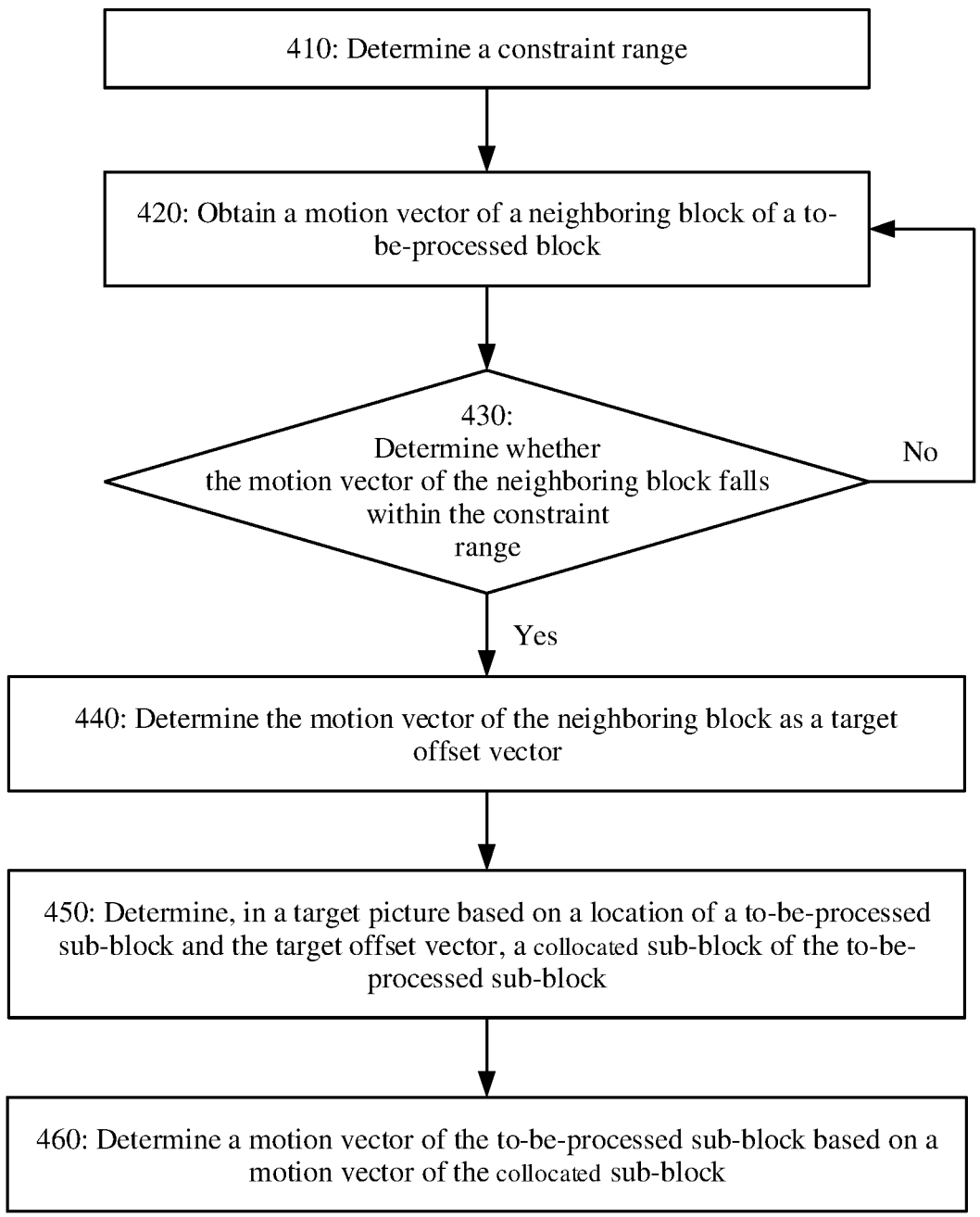
FIG. 14 is a flowchart of a motion vector obtaining method according to an embodiment of this application.

As shown in FIG. 14, a specific motion vector obtaining process in Embodiment 2 includes the following steps.

410: Determine a constraint range.

A meaning and a determining manner of the constraint range herein are the same as those of the constraint range in Embodiment 1, and details are not described herein again.

420: Obtain a motion vector of a neighboring block of a to-be-processed block.

Specifically, a motion vector of the first available neighboring block may be obtained in an order of $A_1$, $B_1$, $B_0$, and $A_0$ in FIG. 4.

Alternatively, a target picture may be first determined, and then the motion vector of the neighboring block of the to-be-processed block is obtained in an order of $A_1$, $B_1$, $B_0$, and $A_0$ in FIG. 4. When the motion vector points to the target picture, step 430 is performed. When the motion vector does not point to the target picture, the motion vector is scaled, so that a scaled motion vector points to the target picture. Then, the scaled motion vector is used as a motion vector of the neighboring block, and step 440 continues to be performed.

430: Determine whether the motion vector of the neighboring block falls within the constraint range.

When a value of a component of the motion vector of the neighboring block falls within the constraint range, step 440 is performed; or when a value of a component of the motion vector of the neighboring block does not fall within the constraint range, step 420 continues to be performed, until a value of a component of the motion vector of the neighboring block falls within the constraint range.

It should be understood that, when values of components of the motion vector of the neighboring block in both a first direction and a second direction fall within the constraint range, it is determined that the motion vector of the neighboring block falls within the constraint range. When a value of a component of the motion vector of the neighboring block in a first direction and/or a value of a component of the motion vector of the neighboring block in a second direction fall/falls outside the constraint range, it is determined that the motion vector of the neighboring block does not fall within the constraint range (the motion vector of the neighboring block falls outside the constraint range).

440: Determine the motion vector of the neighboring block as a target offset vector.

450: Determine, in the target picture based on a location of a to-be-processed sub-block and the target offset vector, a collocated sub-block of the to-be-processed sub-block.

460: Determine a motion vector of the to-be-processed sub-block based on a motion vector of the collocated sub-block.

Specifically, the motion vector of the collocated sub-block may be scaled based on a POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

After the motion vector of the to-be-processed sub-block is obtained, a predicted sample value of the to-be-processed sub-block may be determined based on the motion vector of the to-be-processed sub-block.

Embodiment 3

Figure 15:
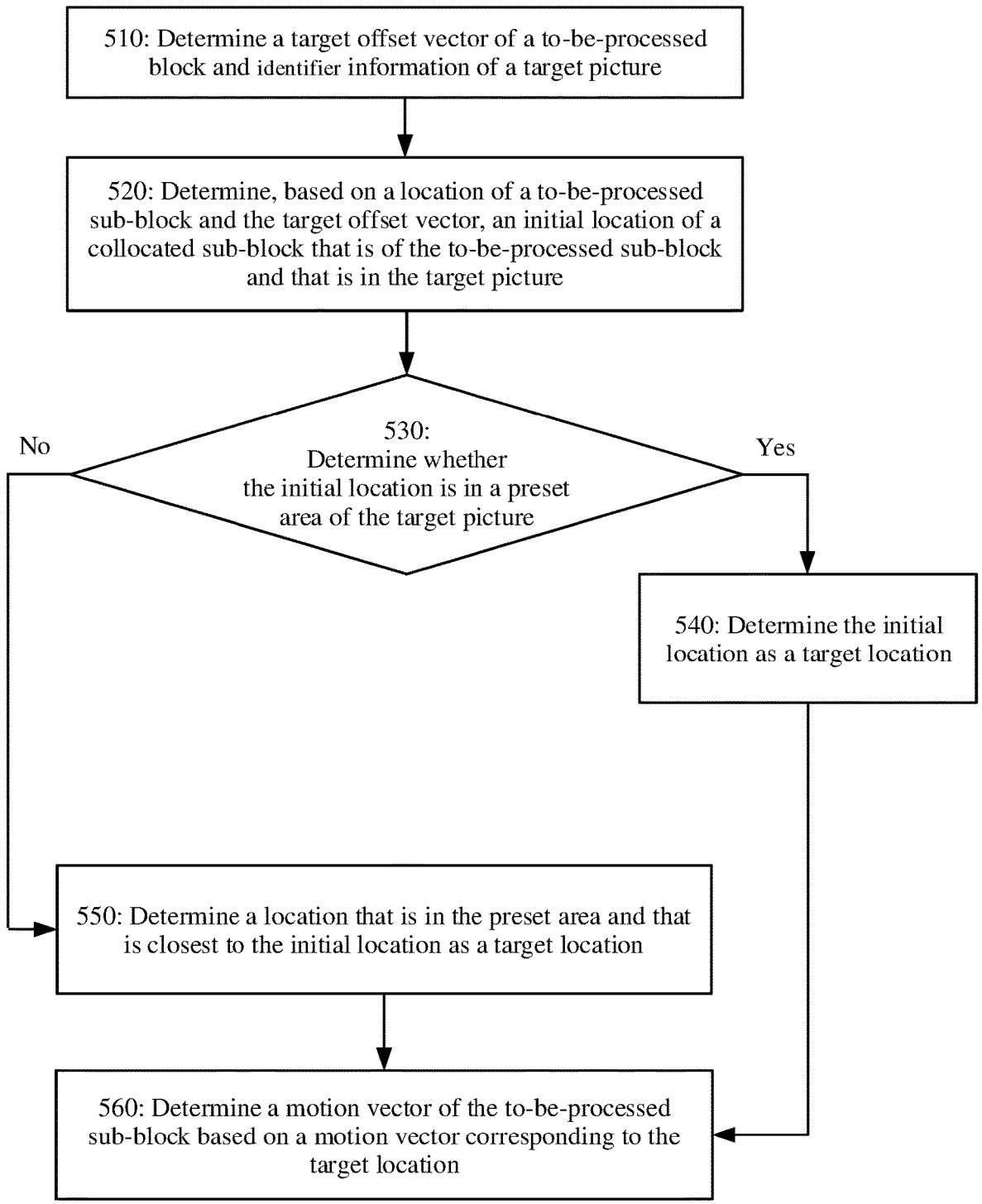
FIG. 15 is a flowchart of a motion vector obtaining method according to an embodiment of this application.

As shown in FIG. 15, a specific motion vector obtaining process in Embodiment 3 includes the following steps.

510: Determine a target offset vector of a to-be-processed block and identifier information of a target picture.

A process of determining the target offset vector and the identifier information of the target picture in step 510 is the same as that in step 210.

520: Determine, based on a location of a to-be-processed sub-block and the target offset vector, an initial location of a collocated sub-block that is of the to-be-processed sub-block and that is in the target picture.

Specifically, location coordinates of the initial location of the collocated sub-block that is of the to-be-processed sub-block and that is in the target picture may be determined according to a formula (18):

$$\begin{cases} x_{(i,j)} = x + M \times i + \dfrac{M}{2} + x_{off} \\ y_{(i,j)} = y + N \times j + \dfrac{N}{2} + y_{off} \end{cases} \quad (18)$$

Herein, (x, y) represents coordinates of the top-left vertex of the to-be-processed block, i represents the $i^{th}$ sub-block from left to right in the to-be-processed block, j represents the $j^{th}$ sub-block from top to bottom in the to-be-processed block, ($x_{off}$, $y_{off}$) represents values of components of the target offset motion vector in a first direction and a second direction, M and N represent a size of the to-be-processed sub-block (where M may represent the width of the to-be-processed sub-block, and N may represent the height of the to-be-processed sub-block), and ($x_{(i,\ j)}$, $y_{(i,\ j)}$) represents location coordinates of the (i, j)$^{th}$ collocated sub-block.

530: Determine whether the initial location is in a preset area of the target picture.

When the initial location is in the preset area of the corresponding picture, step 540 is directly performed. When the initial location is outside the preset area of the corresponding picture, step 550 is performed.

The preset area may be a fixed range in the target picture, and the preset area of the corresponding picture may be determined according to a formula (19) to a formula (22):

$$\text{HorMin}=\text{Min}(\text{CTUX}-\text{Range}L,0) \quad (19)$$

$$\text{HorMax}=\text{Max}(\text{CTUX}+\text{CTUW}+\text{Range}R-1,\text{Pic}W-1) \quad (20)$$

$$\text{VerMin}=\text{Min}(\text{CTUY}-\text{Range}U,0) \quad (21)$$

$$\text{VerMax}=\text{Max}(\text{CTUY}+\text{CTUH}+\text{Range}B-1,\text{Pic}H-1) \quad (22)$$

HorMin and HorMax represent a minimum value and a maximum value in a constraint range in a horizontal direction, VerMin and VerMax represent a minimum value and a maximum value in the constraint range in a vertical direction, CTUX and CTUY represent location coordinates of a top-left sample of a CTU in which the to-be-processed block is located, CTUW and CTUH represent the width and the height of the CTU, RangeU, RangeB, RangeL, and RangeR respectively represent extension values that are in an upward direction, a downward direction, a left direction, and a right direction and that are of a temporal motion vector field of the CTU, and PicW and PicH are respectively the width and the height of the target picture.

540: Determine the initial location as a target location.

The initial location may be directly determined as the target location when the initial location is inside the preset area of the target picture.

550: Determine a location that is in the preset area and that is closest to the initial location as a target location.

Specifically, the location that is in the preset area and that is closest to the initial location may be determined as the target location when the initial location is outside the preset area of the target picture. Specifically, when the initial location is outside the preset area of the target picture, the target location may be determined according to a formula (23) and a formula (24):

$$x_{(i,j)}=\text{Clip3}(\text{HorMin},\text{HorMax},x_{(i,j)}) \quad (23)$$

$$y_{(i,j)}=\text{Clip3}(\text{VerMin},\text{VerMax},y_{(i,j)}) \quad (24)$$

Herein, a Clip3 function is a clipping function, and a specific definition is shown in the foregoing formula (17).

560: Determine a motion vector of the to-be-processed sub-block based on a motion vector corresponding to the target location.

Specifically, the motion vector of the target location may be scaled based on a POC of a picture including the to-be-processed sub-block, a POC of a target reference picture of the picture including the to-be-processed sub-block, a POC of the target picture, and a POC of a target reference picture of the target picture, to obtain the motion vector of the to-be-processed sub-block.

After the motion vector of the to-be-processed sub-block is obtained, a predicted sample value of the to-be-processed sub-block may be determined based on the motion vector of the to-be-processed sub-block.

Figure 16:
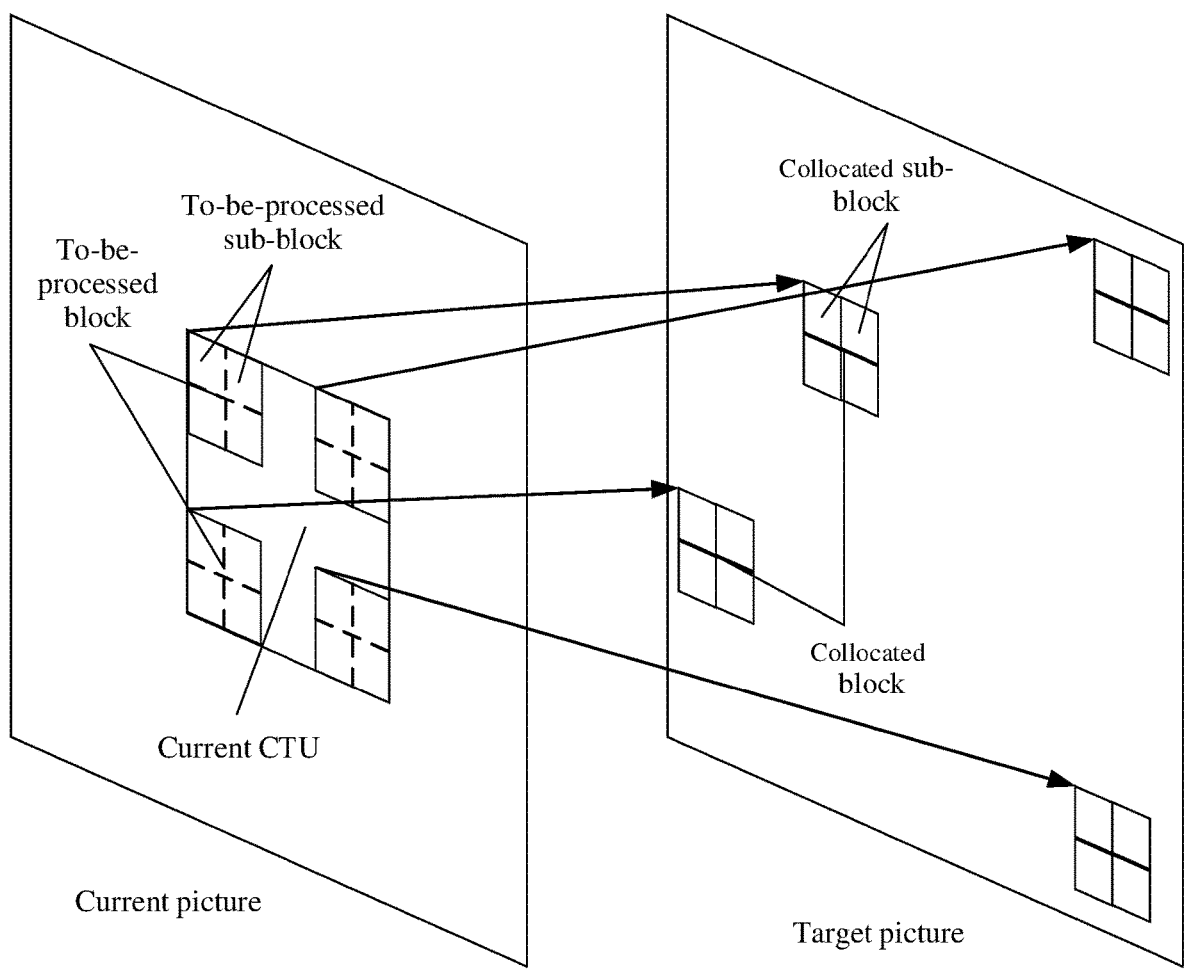
FIG. 16 is a schematic diagram of determining a collocated sub-block of a to-be-processed sub-block in an existing solution.
Figure 17:
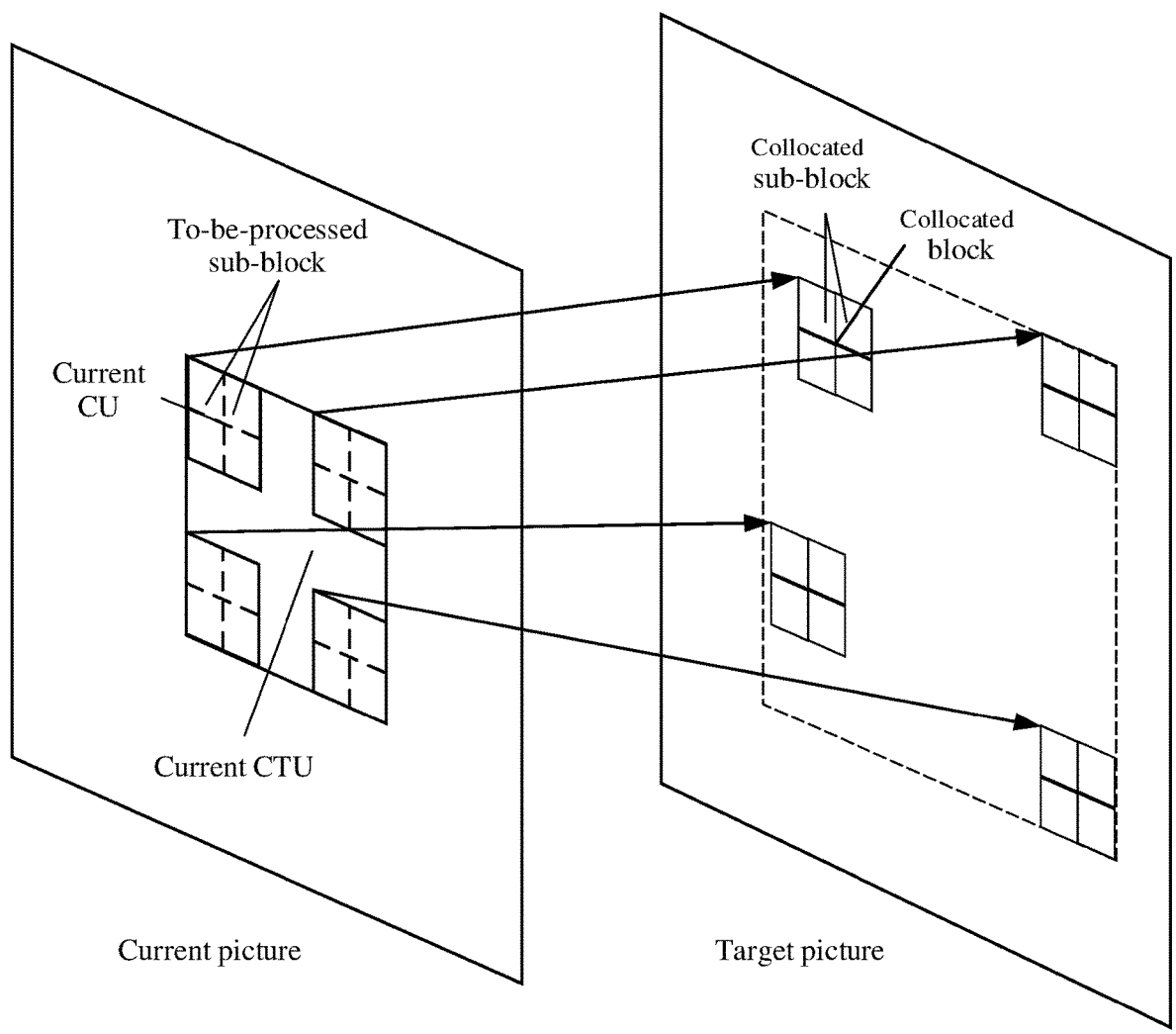
FIG. 17 is a schematic diagram of determining a collocated sub-block of a to-be-processed sub-block according to this application.

To better understand beneficial effects brought by this application, the following describes beneficial effects of the motion vector obtaining method in the embodiments of this application in detail with reference to FIG. 16 and FIG. 17.

As shown in FIG. 16, a current picture includes a current CTU, the current CTU includes a plurality of to-be-processed blocks, each to-be-processed block includes a plurality of to-be-processed sub-blocks, and each to-be-processed block corresponds to one offset vector. A corresponding block of the to-be-processed block can be found based on the corresponding offset vector. Each to-be-processed sub-block corresponds to one collocated sub-block in a target picture. If an area in which the collocated sub-block, in the target picture, corresponding to the to-be-processed sub-block is located is uncertain, or a location, in the target picture, corresponding to the to-be-processed sub-block is uncertain, when a motion vector of the collocated sub-block is to be obtained, a temporal motion vector field of the entire corresponding picture possibly needs to be obtained in advance. Consequently, memory bandwidth increases.

As shown in FIG. 17, a current picture includes a current CTU, the current CTU includes a plurality of to-be-processed blocks, each to-be-processed block includes a plurality of to-be-processed sub-blocks, and a dashed-line area in a target picture indicates a preset area of the target picture. In this application, a range of an offset vector of the to-be-processed block is constrained, so that a collocated sub-block that is in the target picture and that corresponds to a to-be-processed sub-block is inside the preset area of the target picture, or a corresponding location of a collocated sub-block that is of a to-be-processed sub-block and that is in the target picture is inside the preset area of the target picture. In this way, a motion vector of only the collocated sub-block or the corresponding location needs to be obtained, and a motion vector of the entire target picture does not need to be obtained. This can reduce memory bandwidth. In addition, a quantity of memory read times can be reduced through pre-reading.

The motion vector obtaining method in the embodiments of this application may be applied to a merge mode of inter prediction.

In a sub coding unit based motion vector prediction (Sub-CU based motion vector prediction, SMVP) technology, a current coding unit is partitioned into sub coding units with a size M×N, motion information of each sub coding unit is deduced, and then motion compensation is performed based on the motion information of each sub coding unit, to obtain a predictor of the current coding unit.

When the SMVP technology is applied to the merge mode, two types of candidate motion information: advanced temporal motion vector prediction (advanced temporal motion vector prediction, ATMVP) and spatial-temporal motion vector prediction (spatial-temporal motion vector prediction, STMVP), are added based on the original merge mode.

In the ATMVP technology, a collocated reference picture (collocated reference picture) is first determined, then a current coding unit is partitioned into sub coding units with a size M×N, motion information of a sample at the center point of a sub coding unit that is in the collocated reference picture and that corresponds to each current sub coding unit is obtained, and the motion information is scaled, to translate the motion information into motion information of each current sub coding unit. The motion vector obtaining method in the embodiments of this application may be understood as an improved ATMVP technology.

Figure 18:
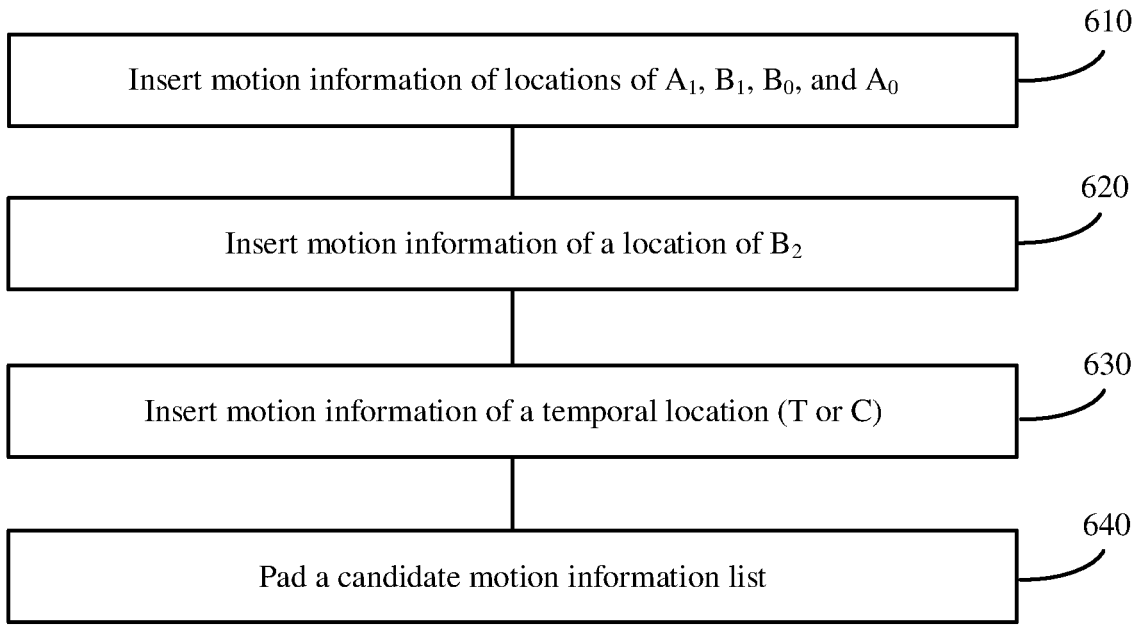
FIG. 18 shows a candidate information list construction process in an existing merge mode.
Figure 19:
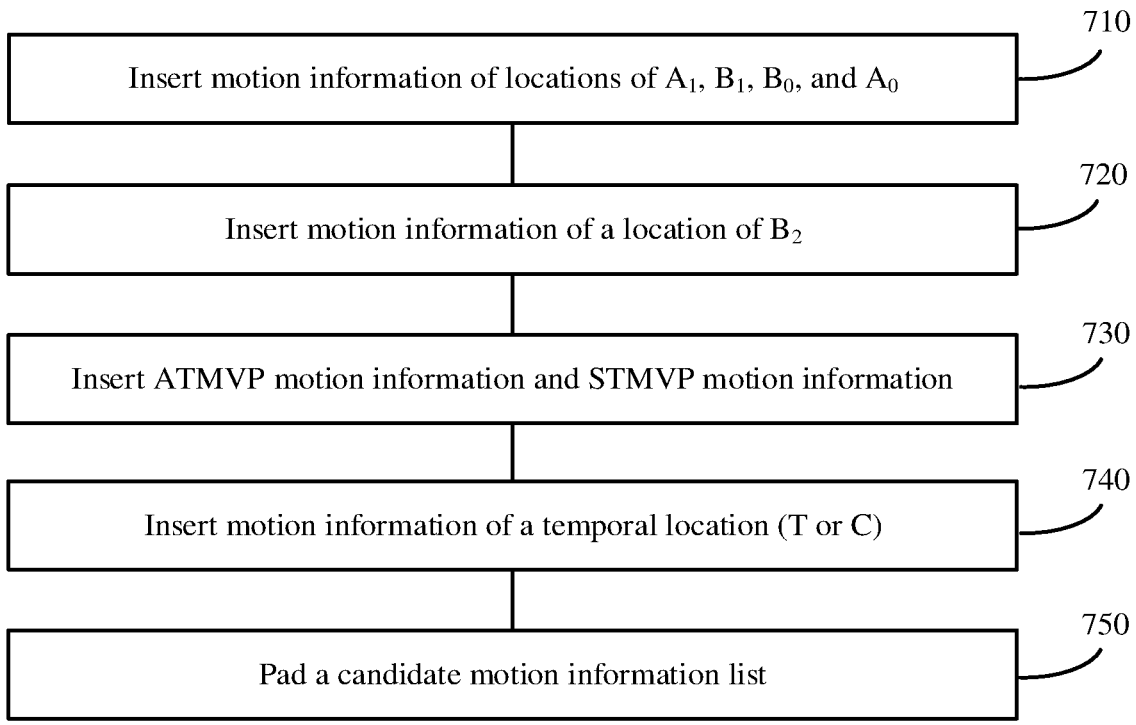
FIG. 19 shows a candidate information list construction process in a merge mode to which an SMVP technology is applied.

Based on neighboring blocks of a to-be-processed block shown in FIG. 4, the following separately describes, with reference to FIG. 18 and FIG. 19, a candidate information list construction process in an existing merge mode and a candidate information list construction process in a merge mode to which an SMVP technology is applied.

The candidate information list construction process in the existing merge mode is shown in FIG. 18.

The candidate information list construction process shown in FIG. 18 includes the following steps:

610: Insert motion information of locations of $A_1$, $B_1$, $B_0$, and $A_0$.

620: Insert motion information of a location of $B_2$.

630: Insert motion information of a temporal location (T or C).

640: Pad a candidate motion information list.

The candidate information list construction process in the merge mode to which the SMVP technology is applied is shown in FIG. 19.

The candidate information list construction process shown in FIG. 19 includes the following steps:

710: Insert motion information of locations of $A_1$, $B_1$, $B_0$, and $A_0$.

720: Insert ATMVP motion information and STMVP motion information.

730: Insert motion information of a location of $B_2$.

740: Insert motion information of a temporal location (T or C).

750: Pad a candidate motion information list.

Compared with FIG. 18, FIG. 19 additionally includes step 720 of inserting the ATMVP motion information and the STMVP motion information. Other steps remain unchanged.

It should be understood that the motion vector that is of the to-be-processed sub-block and that is obtained according to the motion vector obtaining method in the embodiments of this application is a part of the ATMVP motion information inserted in step 720.

Specifically, based on the neighboring blocks of the to-be-processed block shown in FIG. 4, when the SMVP technology is applied to the merge mode, encoding in the merge mode specifically includes the following process:

(1) Obtain motion information of locations of spatially neighboring blocks $A_1$, $B_1$, $B_0$, and $A_0$ in order, check availability, delete a repeated item, and insert the motion information into a candidate motion information list.

(2) Obtain ATMVP motion information and STMVP motion information, check availability, delete a repeated item, and insert the motion information into the candidate motion information list.

(3) When a length of the candidate motion information list is less than 6, obtain motion information of a location of $B_2$, check availability, delete a repeated item, and insert the motion information into the candidate motion information list.

(4) Obtain motion information of a block corresponding to a location Tin a neighboring encoded frame (if the motion information does not exist, motion information of a block corresponding to a location C is obtained), scale the motion information, and insert scaled motion information into the candidate motion information list.

(5) If the length of the candidate motion information list is less than 7, perform padding to obtain a candidate motion information list whose length is 7.

(6) Traverse each piece of candidate motion information in the candidate motion information list, perform motion compensation and reconstruction to obtain a reconstruction value, and then determine candidate motion information with lowest rate distortion costs (rate distortion cost, RD cost) according to a rate distortion optimization (rate distortion optimization, RDO) method, to obtain a merge index (index).

(7) Write the merge index into a bitstream based on the length of the candidate motion information list, and transmit the bitstream to a decoder side.

A candidate motion information list construction process in a merge mode is shown in FIG. 19.

The foregoing describes the motion vector obtaining method in the embodiments of this application in detail with reference to FIG. 3 to FIG. 19. It should be understood that the motion vector obtaining method in the embodiments of this application may correspond to the inter prediction shown in FIG. 1 and FIG. 2. The motion vector obtaining method in the embodiments of this application may be performed in the inter prediction processes shown in FIG. 1 and FIG. 2. The motion vector obtaining method in the embodiments of this application may be specifically performed by an inter prediction module in an encoder or a decoder. In addition, the motion vector obtaining method in the embodiments of this application may be implemented in any electronic device or apparatus that may need to encode and/or decode a video picture.

Figure 20:
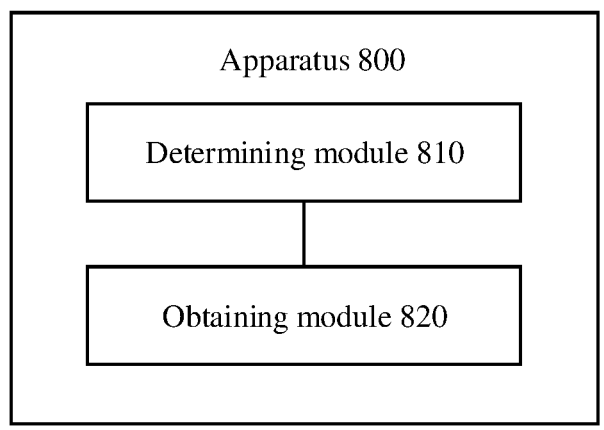
FIG. 20 is a schematic block diagram of a motion vector obtaining apparatus according to an embodiment of this application.
Figure 21:
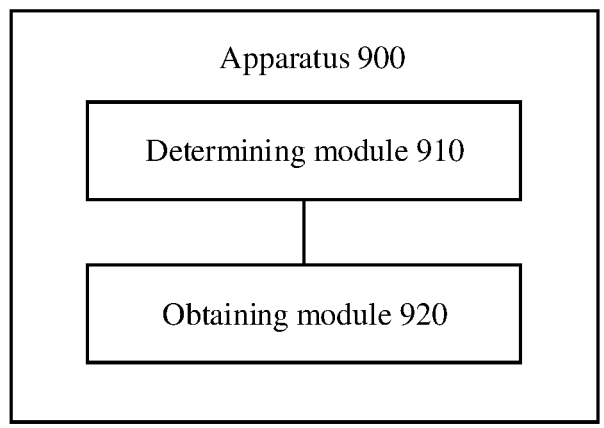
FIG. 21 is a schematic block diagram of a motion vector obtaining apparatus according to an embodiment of this application.

The following describes motion vector obtaining apparatuses in the embodiments of this application in detail with reference to FIG. 20 and FIG. 21. An apparatus shown in FIG. 20 corresponds to the methods shown in FIG. 3, FIG. 13, and FIG. 14, and can perform the steps in the methods shown in FIG. 3, FIG. 13, and FIG. 14. An apparatus shown in FIG. 21 corresponds to the methods shown in FIG. 9 and FIG. 15, and can perform the steps in the methods shown in FIG. 9 and FIG. 15. For brevity, repeated descriptions are appropriately omitted below.

FIG. 20 is a schematic block diagram of a motion vector obtaining apparatus 800 according to an embodiment of this application. The apparatus 800 shown in FIG. 20 includes:

a determining module 810, where the determining module 810 is configured to:

determine a first value range and a second value range;

determine a target offset vector of a to-be-processed block and identifier information of a target picture, where the to-be-processed block includes at least one to-be-processed sub-block, a value of a component of the target offset vector in a first direction falls within the first value range, a value of a component of the target offset vector in a second direction falls within the second value range, and the first direction and the second direction are in an orthogonal relationship; and determine, in the target picture based on a location of the to-be-processed sub-block and the target offset vector, a collocated sub-block of the to-be-processed sub-block; and an obtaining module 820, configured to obtain a motion vector of the to-be-processed sub-block based on a motion vector of the collocated sub-block.

In this application, because the component value of the target offset vector falls within a specific value range, the to-be-processed sub-block determined in the target picture based on the target offset vector also falls within a specific range of the target picture. Therefore, memory bandwidth and a quantity of memory read times can be reduced by pre-reading a temporal motion vector field in the specific range of the target picture.

The determining module 810 and the obtaining module 820 may correspond to a prediction module (which may be specifically an inter prediction module) in an encoding and decoding apparatus. During specific implementation, the determining module 810 and the obtaining module 820 may be implemented by using software or hardware, or may be implemented by using a combination of software and hardware.

FIG. 21 is a schematic block diagram of a motion vector obtaining apparatus according to an embodiment of this application. The apparatus 900 shown in FIG. 21 includes:

a determining module 910, where the determining module is configured to:

determine a target offset vector of a to-be-processed block and identifier information of a target picture, where the to-be-processed block includes at least one to-be-processed sub-block;

determine, based on a location of the to-be-processed sub-block and the target offset vector, an initial location of a collocated sub-block that is of the to-be-processed sub-block and that is in the target picture; and determine the initial location as a target location when the initial location is inside a preset area of the target picture; or determine a location that is in the preset area and that is closest to the initial location as a target location when the initial location is outside the preset area; and an obtaining module 920, configured to obtain a motion vector of the to-be-processed sub-block based on a motion vector corresponding to the target location.

In this application, the target location inside the preset area is found based on the initial location and the preset area of the target picture, and then the motion vector of the to-be-processed sub-block is determined based on a motion vector in a specific range of the target picture. Therefore, memory bandwidth and a quantity of memory read times can be reduced by pre-reading a temporal motion vector field in the specific range of the target picture.

The determining module 910 and the obtaining module 920 may correspond to a prediction module, which may be specifically an inter prediction module, in an encoding and decoding apparatus. During specific implementation, the determining module 910 and the obtaining module 920 may be implemented by using software or hardware, or may be implemented by using a combination of software and hardware.

The motion vector obtaining method in the embodiments of this application may be alternatively performed by a video encoder or a video decoder. The following describes structures of the video encoder and the video decoder in the embodiments of this application with reference to FIG. 22 and FIG. 23.

Figure 22:
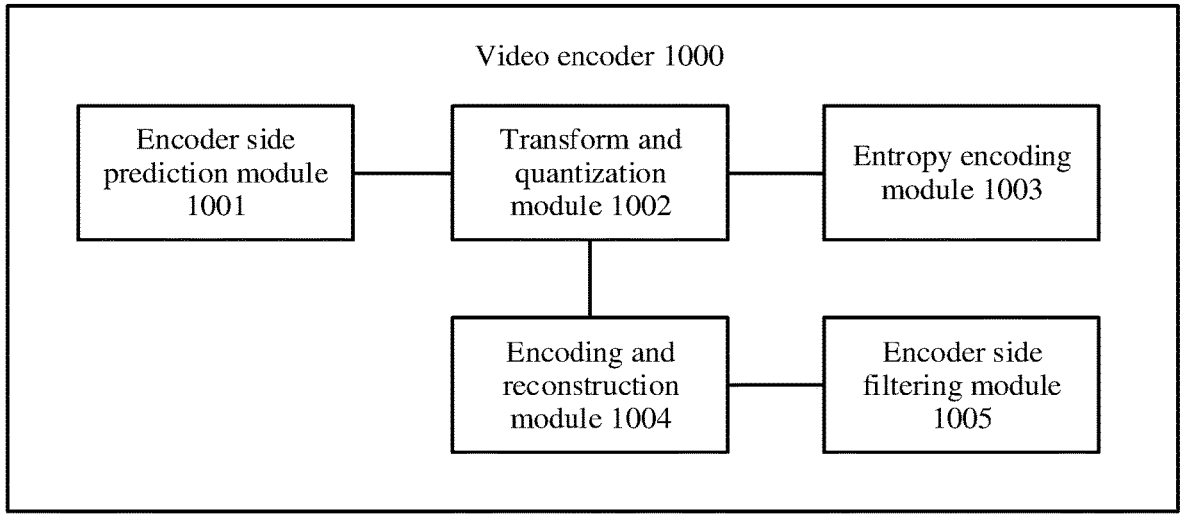
FIG. 22 is a schematic block diagram of a video encoder according to an embodiment of this application.

FIG. 22 is a schematic block diagram of a video encoder according to an embodiment of this application. The video encoder 1000 shown in FIG. 22 includes an encoder side prediction module 1001, a transform and quantization module 1002, an entropy encoding module 1003, an encoding and reconstruction module 1004 and an encoder side filtering module.

The video encoder 1000 shown in FIG. 22 may encode a video. Specifically, the video encoder 1000 may perform the video encoding process shown in FIG. 1, to encode the video. In addition, the video encoder 1000 may further perform the motion vector obtaining method in the embodiments of this application, and the video encoder 1000 may perform the steps of the methods shown in FIG. 3, FIG. 9, and FIG. 13 to FIG. 15.

The motion vector obtaining apparatus in the embodiments of this application may be the encoder side prediction module 1001 in the video encoder 1000. Specifically, the apparatus 800 and the apparatus 900 shown in FIG. 20 and FIG. 21 are equivalent to the encoder side prediction module 1001 in the video encoder 1000.

Figure 23:
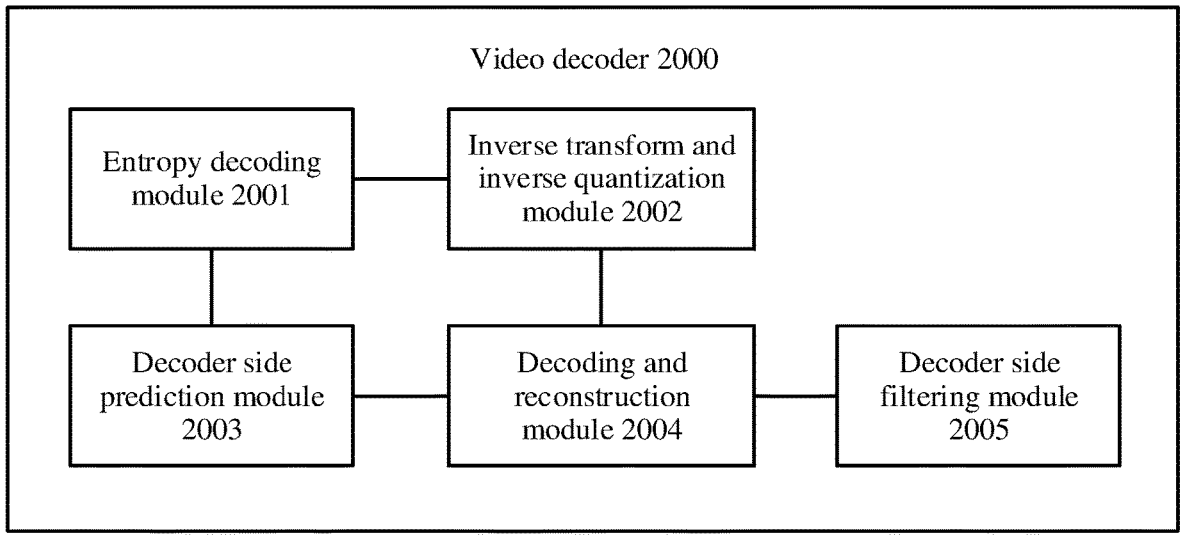
FIG. 23 is a schematic block diagram of a video decoder according to an embodiment of this application.

FIG. 23 is a schematic block diagram of a video decoder according to an embodiment of this application. The video decoder 2000 shown in FIG. 23 includes an entropy decoding module 2001, an inverse transform and inverse quantization module 2002, a decoder side prediction module 2003, a decoding and reconstruction module 2004, and a decoder side filtering module 2005.

The video decoder 2000 shown in FIG. 23 may decode a video. Specifically, the video decoder 2000 may perform the video decoding process shown in FIG. 2, to decode the video. In addition, the video decoder 2000 may further perform the motion vector obtaining method in the embodiments of this application, and the video decoder 2000 may perform the steps of the motion vector obtaining methods shown in FIG. 3, FIG. 9, and FIG. 13 to FIG. 15.

The motion vector obtaining apparatus in the embodiments of this application may be the decoder side prediction module 2003 in the video decoder 2000. Specifically, the apparatus 800 and the apparatus 900 shown in FIG. 20 and FIG. 21 are equivalent to the decoder side prediction module 2003 in the video decoder 2000.

Figure 24:
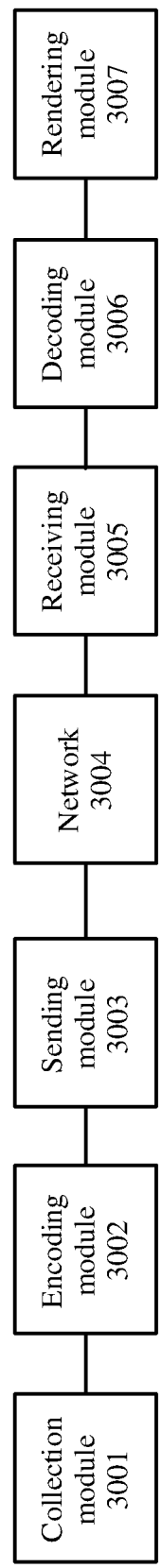
FIG. 24 is a schematic block diagram of a video transmission system according to an embodiment of this application.
Figure 25:
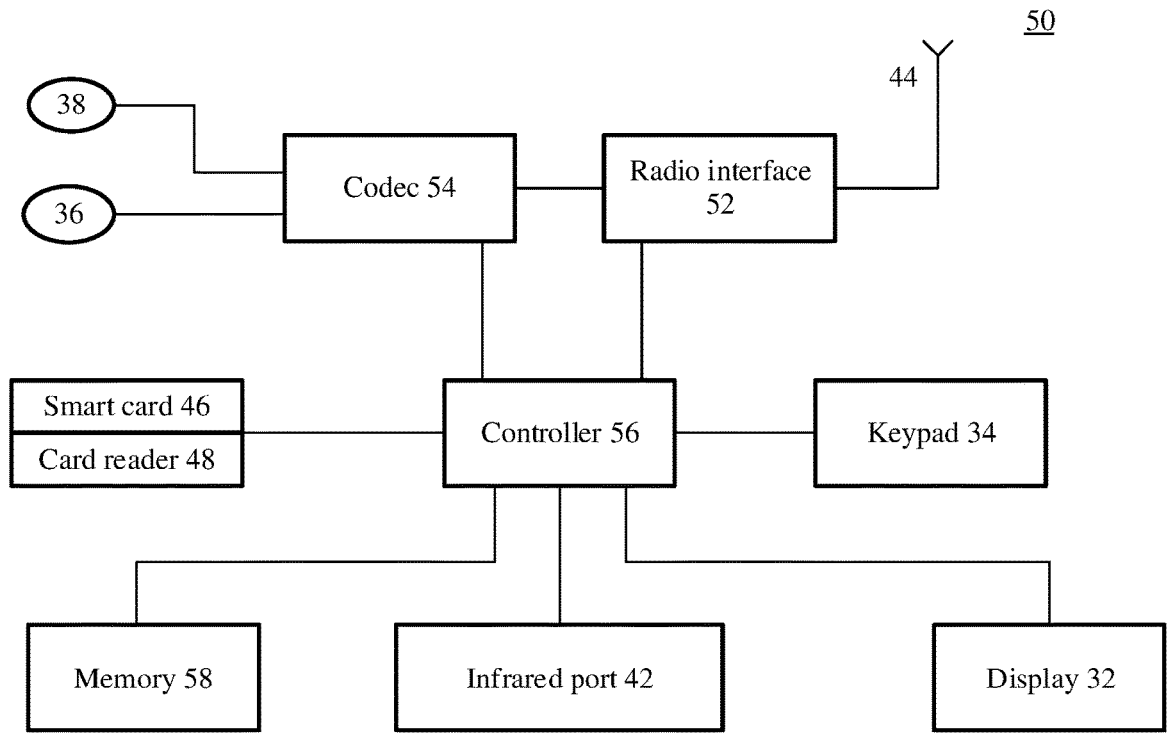
FIG. 25 is a schematic block diagram of a video encoding and decoding apparatus according to an embodiment of this application.
Figure 26:
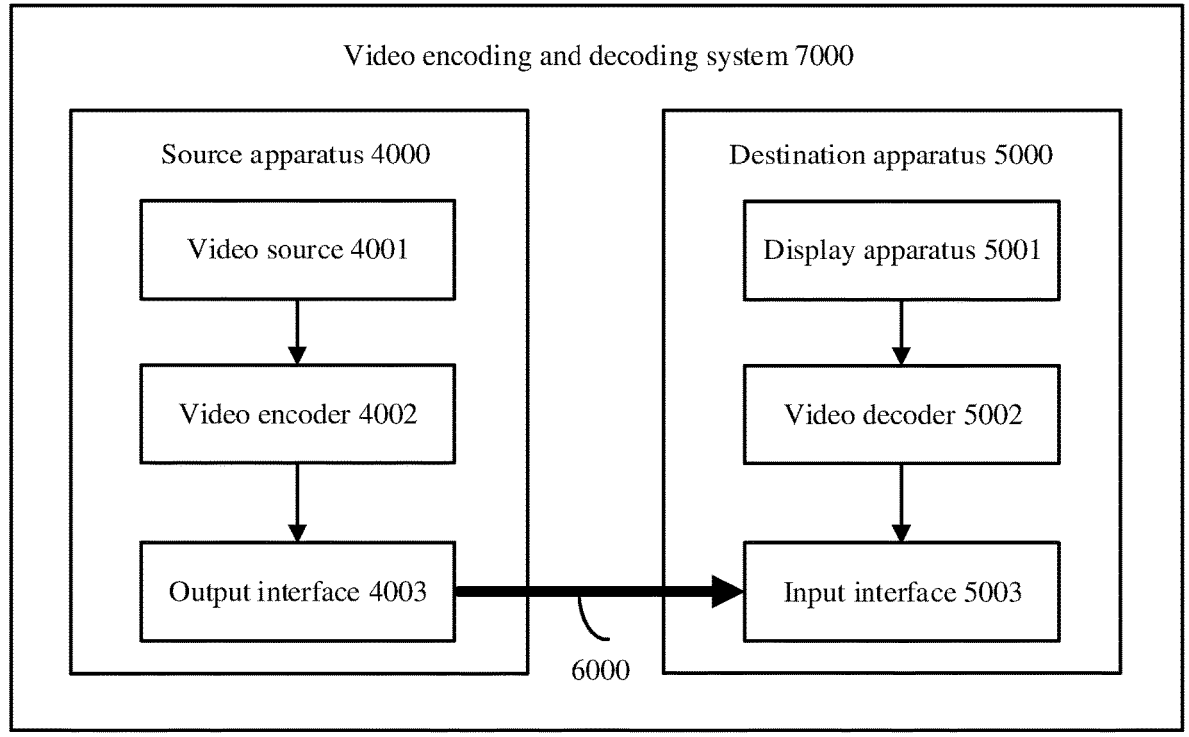
FIG. 26 is a schematic block diagram of a video encoding and decoding system according to an embodiment of this application.

The following describes an application scenario of the motion vector obtaining method in the embodiments of this application with reference to FIG. 24 to FIG. 26. The motion vector obtaining method in the embodiments of this application may be performed by a video transmission system, an encoding and decoding apparatus, and an encoding and decoding system shown in FIG. 24 to FIG. 26.

FIG. 24 is a schematic block diagram of a video transmission system according to an embodiment of this application.

As shown in FIG. 24, the video transmission system includes a collection module 3001, an encoding module 3002, a sending module 3003, network transmission 3004, a receiving module 3005, a decoding module 3006, and a rendering module 3007.

The modules in the video transmission system have the following specific functions:

The collection module 3001 includes a camera or a camera group and is configured to collect a video picture and perform processing on the collected video picture before encoding, to convert an optical signal into a digitalized video sequence.

The encoding module 3002 is configured to encode the video sequence to obtain a bitstream.

The sending module 3003 is configured to send the encoded bitstream.

The receiving module 3005 is configured to receive the bitstream sent by the sending module 3003.

The network 3004 is configured to transmit, to the receiving module 3005, the bitstream sent by the sending module 3003.

The decoding module 3006 is configured to decode the bitstream received by the receiving module 3005 to reconstruct the video sequence.

The rendering module 3007 is configured to render a reconstructed video sequence obtained through decoding by the decoding module 3006, to improve a video display effect.

The video transmission system shown in FIG. 24 may perform the motion vector obtaining method in the embodiments of this application. Specifically, both the encoding module 3002 and the decoding module 3006 in the video transmission system shown in FIG. 24 may perform the motion vector obtaining method in the embodiments of this application.

The following describes in detail an encoding and decoding apparatus and an encoding and decoding system including the encoding and decoding apparatus with reference to FIG. 25 and FIG. 26. It should be understood that the encoding and decoding apparatus and the encoding and decoding system shown in FIG. 25 and FIG. 26 can perform the motion vector obtaining method in the embodiments of this application.

FIG. 25 is a schematic diagram of a video encoding and decoding apparatus according to an embodiment of this application. The video encoding and decoding apparatus 50 may be an apparatus dedicated for encoding and/or decoding a video picture, or an electronic device having a video encoding and decoding function. Alternatively, the encoding and decoding apparatus 50 may be a mobile terminal or user equipment in a wireless communications system.

The encoding and decoding apparatus 50 may include the following modules or units: a controller 56, a codec 54, a radio interface 52, an antenna 44, a smart card 46, a card reader 48, a keypad 34, a memory 58, an infrared port 42, and a display 32. In addition to the modules and the units shown in FIG. 25, the encoding and decoding apparatus 50 may further include a microphone and any appropriate audio input module. The audio input module may input a digital signal or an analog signal. The encoding and decoding apparatus 50 may further include an audio output module. The audio output module may be a headset, a speaker, or an analog audio output connection or a digital audio output connection. The encoding and decoding apparatus 50 may further include a battery. The battery may be a solar cell, a fuel cell, or the like. The encoding and decoding apparatus 50 may further include the infrared port configured to perform short-range line-of-sight communication with another device. The encoding and decoding apparatus 50 may alternatively communicate with the another device in any appropriate short-range communication mode, for example, through a Bluetooth wireless connection or a USB/live line wired connection.

The memory 58 may store data in a form of a picture and data in a form of audio, and may also store an instruction to be executed on the controller 56.

The codec 54 may encode and decode audio and/or video data or implement, under the control of the controller 56, assisted encoding and assisted decoding on audio and/or video data.

The smart card 46 and the card reader 48 may provide user information and may also provide authentication information of network authentication and an authorized user. Specific implementation forms of the smart card 46 and the card reader 48 may be a universal integrated circuit card (universal Integrated circuit card, UICC) and a UICC reader.

The radio interface 52 may generate a wireless communication signal. The wireless communication signal may be a communication signal generated during communication in a cellular communications network, a wireless communications system, or a wireless local area network.

The antenna 44 is configured to send, to another apparatus (there may be one or more apparatuses), a radio frequency signal generated by the radio interface 52, and may be further configured to receive a radio frequency signal from another apparatus (there may be one or more apparatuses).

In some embodiments of this application, the encoding and decoding apparatus 50 may receive to-be-processed video picture data from another device before transmission and/or storage. In some other embodiments of this application, the encoding and decoding apparatus 50 may receive a picture through a wireless or wired connection and encode/decode the received picture.

FIG. 26 is a schematic block diagram of a video encoding and decoding system 7000 according to an embodiment of this application.

As shown in FIG. 26, the video encoding and decoding system 7000 includes a source apparatus 4000 and a destination apparatus 5000. The source apparatus 4000 generates encoded video data. The source apparatus 4000 may also be referred to as a video encoding apparatus or a video encoding device. The destination apparatus 5000 may decode the encoded video data generated by the source apparatus 4000. The destination apparatus 5000 may also be referred to as a video decoding apparatus or a video decoding device.

Specific implementation forms of the source apparatus 4000 and the destination apparatus 5000 each may be any one of the following devices: a desktop computer, a mobile computing apparatus, a notebook (for example, laptop) computer, a tablet computer, a set top box, a smartphone, a handset, a television, a camera, a display apparatus, a digital media player, a video game console, an in-vehicle computer, or another similar device.

The destination apparatus 5000 may receive the encoded video data from the source apparatus 4000 through a channel 6000. The channel 6000 may include one or more media and/or apparatuses that can move the encoded video data from the source apparatus 4000 to the destination apparatus 5000. In an example, the channel 6000 may include one or more communications media that can enable the source apparatus 4000 to directly transmit the encoded video data to the destination apparatus 5000 in real time. In this example, the source apparatus 4000 may modulate the encoded video data according to a communications standard (for example, a wireless communications protocol) and may transmit the modulated video data to the destination apparatus 5000. The one or more communications media may include wireless and/or wired communications media, for example, a radio frequency (radio frequency, RF) spectrum or one or more physical transmission cables. The one or more communications media may form a part of a packet-based network (for example, a local area network, a wide area network, or a global network (for example, the internet)). The one or more communications media may include a router, a switch, a base station, or another device implementing communication between the source apparatus 4000 and the destination apparatus 5000.

In another example, the channel 6000 may include a storage medium that stores the encoded video data generated by the source apparatus 4000. In this example, the destination apparatus 5000 may access the storage medium through disk access or card access. The storage medium may include a plurality of locally accessible data storage media such as a Blu-ray disc, a high-density digital video disc (digital video disc, DVD), a compact disc read-only memory (compact disc read-only memory, CD-ROM), a flash memory, or another suitable digital storage medium configured to store the encoded video data.

In another example, the channel 6000 may include a file server or another intermediate storage apparatus that stores the encoded video data generated by the source apparatus 4000. In this example, the destination apparatus 5000 may access, through streaming transmission or downloading, the encoded video data stored in the file server or the another intermediate storage apparatus. The file server may be a type of server that can store the encoded video data and transmit the encoded video data to the destination apparatus 5000. For example, the file server may include a world wide web (world wide web, WWW) server (for example, used for a website), a file transfer protocol (file transfer protocol, FTP) server, a network attached storage (network attached storage, NAS) apparatus, or a local disk drive.

The destination apparatus 5000 may access the encoded video data through a standard data connection (for example, an internet connection). An example type of the data connection includes a wireless channel or a wired connection (for example, a cable modem) that is suitable for accessing the encoded video data stored in the file server, or a combination thereof. Transmission of the encoded video data from the file server may be streaming transmission, downloading transmission, or a combination thereof.

The motion vector obtaining method in this application is not limited to a wireless application scenario. For example, the motion vector obtaining method in this application may be applied to video encoding and decoding supporting a plurality of multimedia applications such as the following applications: over-the-air television broadcasting, cable television transmission, satellite television transmission, streaming video transmission (for example, through the internet), encoding of video data stored in a data storage medium, decoding of video data stored in a data storage medium, or another application. In some examples, the video encoding and decoding system 7000 may be configured to support unidirectional or bidirectional video transmission, so as to support applications such as video streaming transmission, video playing, video broadcasting, and/or videotelephony.

In FIG. 26, the source apparatus 4000 includes a video source 4001, a video encoder 4002, and an output interface 4003. In some examples, the output interface 4003 may include a modulator/demodulator (modem) and/or a transmitter. The video source 4001 may include a video capturing apparatus (for example, a video camera), a video archive including previously captured video data, a video input interface configured to receive video data from a video content provider, and/or a computer graphics system configured to generate video data, or include a combination of the foregoing video data sources.

The video encoder 4002 may encode video data from the video source 4001. In some examples, the source apparatus 4000 directly transmits encoded video data to the destination apparatus 5000 through the output interface 4003. The encoded video data may be further stored in a storage medium or a file server, so that the destination apparatus 5000 accesses the encoded video data later for decoding and/or playing.

In the example in FIG. 26, the destination apparatus 5000 includes an input interface 5003, a video decoder 5002, and a display apparatus 5001. In some examples, the input interface 5003 includes a receiver and/or a modem. The input interface 5003 may receive the encoded video data through the channel 6000. The display apparatus 5001 may be integrated with the destination apparatus 5000 or may be located outside the destination apparatus 5000. Usually, the display apparatus 5001 displays decoded video data. The display apparatus 5001 may include a plurality of types of display apparatuses such as a liquid crystal display, a plasma display, an organic light-emitting diode display, or a display apparatus of another type.

The video encoder 4002 and the video decoder 5002 may operate according to a video compression standard (for example, a high efficiency video coding H.265 standard), and may comply with a high efficiency video coding (high efficiency video coding, HEVC) test model (HM). Text description ITU-TH.265(V3) (April 2015) of the H.265 standard is released on Apr. 29, 2015, and may be downloaded from http://handle.itu.int/11.1002/7000/12455. The file is incorporated in this specification by reference in its entirety.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be inside one place, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A motion vector obtaining method for use in image encoding or image decoding implemented by a coding device, comprising:
   determining a target offset motion vector of a to-be-processed block in a current picture and identifier information of a target picture, wherein the to-be-processed block comprises at least one to-be-processed sub-block;
   determining, based on a location of the to-be-processed sub-block and the target offset motion vector, an initial location of a collocated sub-block that is of the to-be-processed sub-block and that is in the target picture;
   determining the initial location as a target location when the initial location is inside a preset area of the target picture;
   determining a location that is in the preset area and that is closest to the initial location as a target location when the initial location is outside the preset area; and
   obtaining a motion vector of the to-be-processed sub-block based on a motion vector corresponding to the target location,
   wherein
   the preset area is represented by a horizontal coordinate value range and a vertical coordinate value range,
   wherein the horizontal coordinate value range comprises a minimum horizontal coordinate value and a maximum horizontal coordinate value, and the vertical coordinate value range comprises a minimum vertical coordinate value and a maximum vertical coordinate value, and
   wherein the target location is determined according to following formulas:

$x_{(i,j)}$=Clip3(HorMin,HorMax,$x_{(i,j)}$); and $y_{(i,j)}$=Clip3(VerMin,VerMax,$y_{(i,j)}$), wherein HorMin is the minimum horizontal coordinate value, HorMax is the maximum horizontal coordinate value, VerMin is the minimum vertical coordinate value, VerMax is the maximum vertical coordinate value, a Clip3 function is a clipping function, and the Clip3 function is defined as follows:

$$\text{Clip3}(x, y, z) = \begin{cases} x; & z < x \\ y; & z > y \\ z; & \text{otherwise} \end{cases};$$

and
   wherein one or more of HorMin, HorMax, VerMin or VerMax of the preset area is determined based on a location and a size of a coding tree unit (CTU) in which the to-be-processed block is included, a size of the target picture, and an extension range of a temporal motion vector field of the CTU.

2. The method according to claim 1, wherein the determining, based on the location of the to-be-processed sub-block and the target offset motion vector, the initial location of the collocated sub-block that is of the to-be-processed sub-block and that is in the target picture comprises:
   offsetting location coordinates of the to-be-processed sub-block according to the following formulas, to obtain location coordinates of the initial location of the collocated sub-block that is of the to-be-processed sub-block and that is in the target picture:

$$\begin{cases} x_{(i,j)} = x + M \times i + \dfrac{M}{2} + x_{\textit{off}} \\ y_{(i,j)} = y + N \times j + \dfrac{N}{2} + y_{\textit{off}} \end{cases},$$

wherein
   (x, y) represents location coordinates of a top-left vertex of the to-be-processed block, i represents the $i^{th}$ sub-block in the to-be-processed block in a horizontal direction, j represents the $j^{th}$ sub-block in the to-be-processed block in a vertical direction, ($x_{\textit{off}}$, $y_{\textit{off}}$) represents values of components of the target offset motion vector in the horizontal direction and the vertical direction, M and N are respectively a width and a height of the to-be-processed sub-block, and ($x_{(i,j)}$, $y_{(i,j)}$) represents the location coordinates of the (i, j)$^{th}$ collocated sub-block.

3. The method according to claim 1, wherein the extension range of the temporal motion vector field of the current CTU comprises: an extension range of the temporal motion vector field of the current CTU in a horizontal direction and an extension range of the temporal motion vector field of the current CTU in a vertical direction.

4. The method according to claim 1, wherein information about the extension range of the temporal motion vector field of the current CTU is carried in at least one of a sequence parameter set SPS, a picture parameter set PPS, or a header field.

5. The method according to claim 1, wherein a value of the extension range of the temporal motion vector field of the CTU is a predetermined value.

6. The method according to claim 1, wherein the preset area is obtained through calculation according to following formulas:

HorMin=Max(CTUX−Range$L$,0);

HorMax=Min(CTUX+CTUW+Range$R$−1,Pic$W$−1);

VerMin=Max(CTUY−RangeU,0); and

VerMax=Min(CTUY+CTUH+RangeB−1,PicH−1),
wherein

HorMin and HorMax are respectively a minimum value and a maximum value of the preset area in the horizontal direction, VerMin and VerMax are respectively a minimum value and a maximum value of the preset area in the vertical direction, CTUX and CTUY represent location coordinates of the CTU in which the to-be-processed block is included, CTUW and CTUH represent a width and a height of the CTU in which the to-be-processed block is included, RangeU, RangeB, RangeL, and RangeR respectively represent extension values that are in an up direction, a bottom direction, a left direction, and a right direction and that are of the temporal motion vector field of the CTU in which the to-be-processed block is included, and PicW and PicH are respectively a width and a height of the target picture.

7. The method according to claim 6, wherein RangeU, RangeB, RangeL, or RangeR is a predetermined value.

8. The method according to claim 1, wherein the determining the target offset motion vector of a to-be-processed block comprises:
determining a motion vector of a spatially neighboring block of the to-be-processed block as the target offset motion vector.

9. The method according to claim 1, wherein the target location indicates a target location of the collocated sub-block of the to-be-processed sub-block.

10. The method according to claim 1, wherein the target offset vector is a temporal vector.

11. A coding apparatus, comprising:
at least one processor; and
one or more memories coupled to the at least one processor and storing programming instructions for execution by the at least one processor to cause the coding apparatus to:
determine a target offset motion vector of a to-be-processed block in a current picture and identifier information of a target picture, wherein the to-be-processed block comprises at least one to-be-processed sub-block;
determine, based on a location of the to-be-processed sub-block and the target offset motion vector, an initial location of a collocated sub-block that is of the to-be-processed sub-block and that is in the target picture;
determine the initial location as a target location when the initial location is inside a preset area of the target picture;
determine a location that is in the preset area and that is closest to the initial location as a target location when the initial location is outside the preset area; and
obtain a motion vector of the to-be-processed sub-block based on a motion vector corresponding to the target location,
wherein
the preset area is represented by a horizontal coordinate value range and a vertical coordinate value range,
the horizontal coordinate value range comprises a minimum horizontal coordinate value and a maximum horizontal coordinate value, and the vertical coordinate value range comprises a minimum vertical coordinate value and a maximum vertical coordinate value, and
wherein the target location is determined according to following formulas:

$x_{(i,j)}$=Clip3(HorMin,HorMax,$x_{(i,j)}$); and $y_{(i,j)}$=Clip3(VerMin,VerMax,$y_{(i,j)}$), wherein HorMin is the minimum horizontal coordinate value, HorMax is the maximum horizontal coordinate value, VerMin is the minimum vertical coordinate value, VerMax is the maximum vertical coordinate value, a Clip3 function is a clipping function, and the Clip3 function is defined as follows:

$$\text{Clip3}(x, y, z) = \begin{cases} x; & z < x \\ y; & z > y \\ z; & \text{otherwise} \end{cases};$$

and
wherein one or more of HorMin, HorMax, VerMin or VerMax of the preset area is determined based on a location and a size of a coding tree unit (CTU) in which the to-be-processed block is included, a size of the target picture, and an extension range of a temporal motion vector field of the CTU.

12. The apparatus according to claim 11, wherein the at least one processor further executes the instructions to:
offsetting location coordinates of the to-be-processed sub-block according to the following formulas, to obtain location coordinates of the initial location of the collocated sub-block that is of the to-be-processed sub-block and that is in the target picture:

$$\begin{cases} x_{(i,j)} = x + M \times i + \dfrac{M}{2} + x_{\textit{off}} \\ y_{(i,j)} = y + N \times j + \dfrac{N}{2} + y_{\textit{off}} \end{cases},$$

wherein
(x, y) represents location coordinates of a top-left vertex of the to-be-processed block, i represents the $i^{th}$ sub-block in the to-be-processed block in a horizontal direction, j represents the $j^{th}$ sub-block in the to-be-processed block in a vertical direction, ($x_{\textit{off}}$, $y_{\textit{off}}$) represents values of components of the target offset motion vector in the horizontal direction and the vertical direction, M and N are respectively a width and a height of the to-be-processed sub-block, and ($x_{(i,j)}$, $y_{(i,j)}$) represents the location coordinates of the (i, j)$^{th}$ collocated sub-block.

13. The apparatus according to claim 11, wherein the extension range of the temporal motion vector field of the current CTU comprises: an extension range of the temporal motion vector field of the current CTU in a horizontal direction and an extension range of the temporal motion vector field of the current CTU in a vertical direction.

14. The apparatus according to claim 11, wherein information about the extension range of the temporal motion vector field of the current CTU is carried in at least one of a sequence parameter set SPS, a picture parameter set PPS, or a header field.

15. The apparatus according to claim 11, wherein a value of the extension range of the temporal motion vector field of the CTU is a predetermined value.

16. The apparatus according to claim 11, wherein the preset area is obtained through calculation according to following formulas:

HorMin=Max(CTUX−RangeL,0);

HorMax=Min(CTUX+CTUW+RangeR−1,PicW−1);

VerMin=Max(CTUY−RangeU,0); and

VerMax=Min(CTUY+CTUH+RangeB−1,PicH−1), wherein

HorMin and HorMax are respectively a minimum value and a maximum value of the preset area in the horizontal direction, VerMin and VerMax are respectively a minimum value and a maximum value of the preset area in the vertical direction, CTUX and CTUY represent location coordinates of the CTU in which the to-be-processed block is included, CTUW and CTUH represent a width and a height of the CTU in which the to-be-processed block is included, RangeU, RangeB, RangeL, and RangeR respectively represent extension values that are in an up direction, a bottom direction, a left direction, and a right direction and that are of the temporal motion vector field of the CTU in which the to-be-processed block is included, and PicW and PicH are respectively a width and a height of the target picture.

17. The apparatus according to claim 16, wherein RangeU, RangeB, RangeL, or RangeR is a predetermined value.

18. A non-transitory computer-readable medium storing computer instructions that, when executed by one or more processors, cause the one or more processors to perform operations of obtaining a motion vector in image encoding or image decoding, the operations comprising:
- determining a target offset motion vector of a to-be-processed block in a current picture and identifier information of a target picture, wherein the to-be-processed block comprises at least one to-be-processed sub-block;
- determining, based on a location of the to-be-processed sub-block and the target offset motion vector, an initial location of a collocated sub-block that is of the to-be-processed sub-block and that is in the target picture;
- determining the initial location as a target location when the initial location is inside a preset area of the target picture;
- determining a location that is in the preset area and that is closest to the initial location as a target location when the initial location is outside the preset area; and
- obtaining a motion vector of the to-be-processed sub-block based on a motion vector corresponding to the target location, wherein the preset area is represented by a horizontal coordinate value range and a vertical coordinate value range, the horizontal coordinate value range comprises a minimum horizontal coordinate value and a maximum horizontal coordinate value, and the vertical coordinate value range comprises a minimum vertical coordinate value and a maximum vertical coordinate value, and wherein the target location is determined according to following formulas:

$x_{(i,j)}$=Clip3(HorMin,HorMax,$x_{(i,j)}$); and $y_{(i,j)}$=Clip3(VerMin,VerMax,$y_{(i,j)}$), wherein HorMin is the minimum horizontal coordinate value, HorMax is the maximum horizontal coordinate value, VerMin is the minimum vertical coordinate value, VerMax is the maximum vertical coordinate value, a Clip3 function is a clipping function, and the Clip3 function is defined as follows:

$$Clip3(x, y, z) = \begin{cases} x; z < x \\ y; z > y \\ z; \text{otherwise} \end{cases}$$

and wherein one or more of HorMin, HorMax, VerMin or VerMax of the preset area is determined based on a location and a size of a coding tree unit (CTU) in which the to-be-processed block is included, a size of the target picture, and an extension range of a temporal motion vector field of the CTU.

* * * * *